US006980558B2

(12) United States Patent
Aramoto

(10) Patent No.: US 6,980,558 B2
(45) Date of Patent: Dec. 27, 2005

(54) METHOD OF DISTRIBUTING PROGRAM TO A PLURALITY OF NODES WITHIN A NETWORK BY USING GATEWAY

(75) Inventor: Masafumi Aramoto, Yokosuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1243 days.

(21) Appl. No.: 09/728,406

(22) Filed: Dec. 1, 2000

(65) Prior Publication Data

US 2001/0002914 A1 Jun. 7, 2001

(30) Foreign Application Priority Data

Dec. 1, 1999 (JP) .............................. 11-342485
Nov. 17, 2000 (JP) ........................ 2000-350546

(51) Int. Cl.[7] ........................ H04L 12/28; H04L 12/56
(52) U.S. Cl. ..................... 370/401; 370/486; 709/203; 710/33
(58) Field of Search ................... 370/386, 401, 370/429, 486; 364/200; 709/201, 224, 203; 710/33

(56) References Cited

U.S. PATENT DOCUMENTS 5,005,122 A * 4/1991 Griffin et al. ............... 709/203
6,240,451 B1 * 5/2001 Campbell et al. ........... 709/224
6,557,054 B2 * 4/2003 Reisman ...................... 710/33
6,662,205 B1 * 12/2003 Bereiter ...................... 709/201
6,704,782 B1 * 3/2004 Achtermann et al. ....... 709/224

FOREIGN PATENT DOCUMENTS

| EP | 0 834 809 A2 | 8/1997 |
| JP | 7-129373 | 5/1995 |
| JP | 10-307783 | 11/1998 |
| JP | 11-345114 | 12/1999 |

* cited by examiner

Primary Examiner—John Pezzlo
(74) Attorney, Agent, or Firm—David G. Conlin; David A. Tucker; Edwards & Angell, LLP

(57) ABSTRACT

The method includes the steps of: responsive to satisfaction of a prescribed condition including updating of a program at a download site, requesting transmission of server and the client programs to a program distribution site specified by management information, from a gateway; receiving the server and the client programs from the program distribution site to the gateway; transmitting the received server program from the gateway to a server node; and transmitting the received client program from the gateway to the client nodes.

15 Claims, 19 Drawing Sheets

FIG.17

| | DECIMAL NOTATION | BINARY NOTATION |
|---|---|---|
| GATEWAY 38 | 10.48.17.1 | 00001010 00110000 00010001 00000001 |
| DOWNLOAD SITE 24 | 10.48.16.1 | 00001010 00110000 00010000 00000001 |
| DOWNLOAD SITE 24 | 10.47.0.1 | 00001010 00101111 00000000 00000001 |

COINCIDENT HIGHER ORDER PREFIX
OF GATEWAY 38 AND DOWNLOAD SITE 24 : 00001010 00110000 0001000

COINCIDENT HIGHER ORDER PREFIX
OF GATEWAY 38 AND DOWNLOAD SITE 24 : 00001010 001

FIG.18

| IP ADDRESS | TYPE NUMBER | URL | PROGRAM | VERSION | OPERATIONAL ENVIRONMENT |
|---|---|---|---|---|---|
| IP ADDRESS OF NODE 32 | TYPE NUMBER DESIGNATED BY MANUFACTURER | DOWNLOAD SERVICE SITE | SERVER PROGRAM NAME | VERSION OF SERVER PROGRAM | |
| IP ADDRESS OF NODE 34 | SAME AS ABOVE | SAME AS ABOVE | CLIENT PROGRAM NAME | VERSION OF CLIENT PROGRAM | OS, FREE CAPACITY |
| IP ADDRESS OF NODE 36 | SAME AS ABOVE | SAME AS ABOVE | CLIENT PROGRAM NAME | VERSION OF CLIENT PROGRAM | OS, FREE CAPACITY |
| | | | | | |

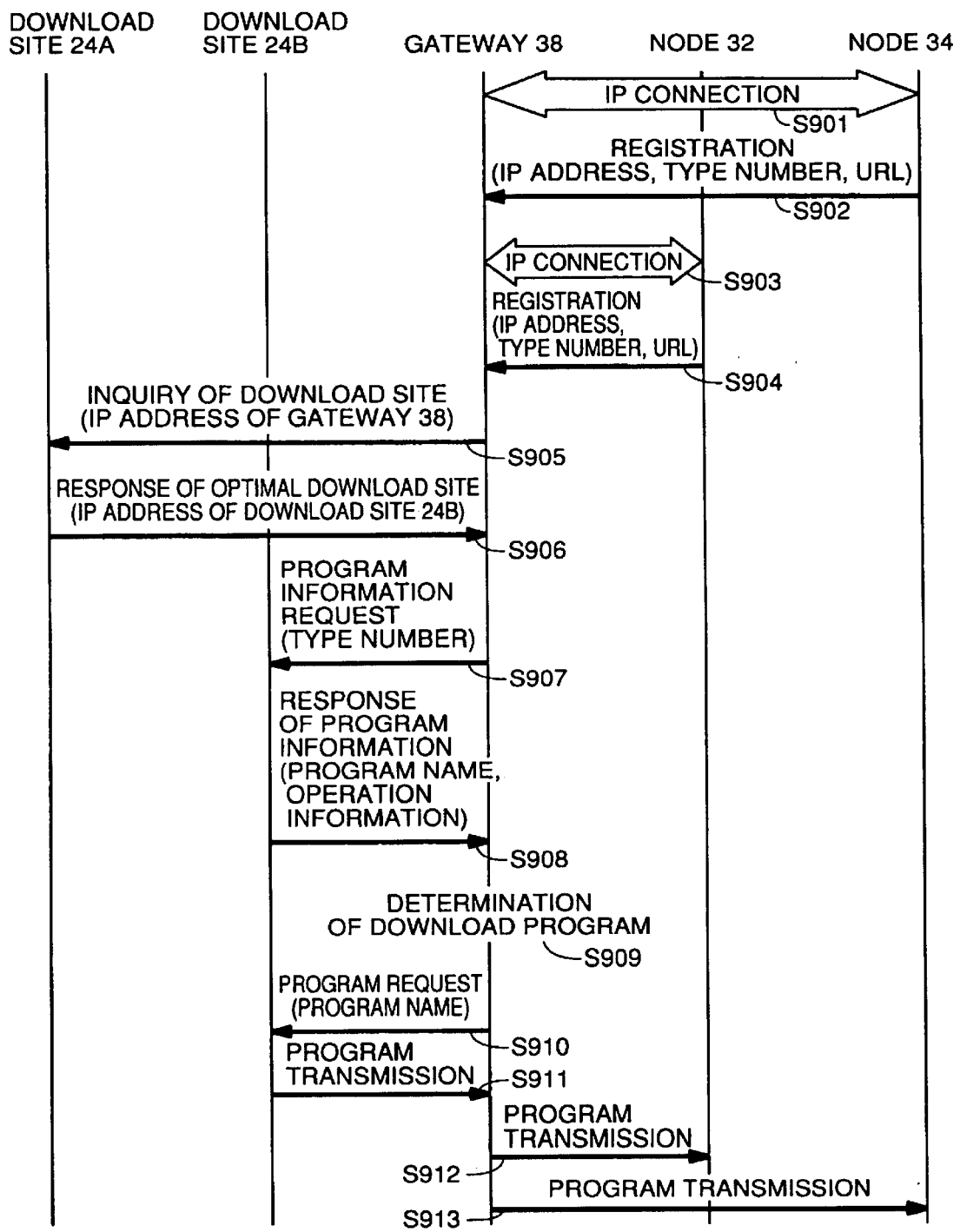

METHOD OF DISTRIBUTING PROGRAM TO A PLURALITY OF NODES WITHIN A NETWORK BY USING GATEWAY

BACKGROUND OF THE INVENTION

1. Field of the Invention

The present invention relates to a method for a node on a network to obtain an application. More specifically, the present invention relates to a method for a node connected to a network such as an LAN (Local Area Network) connected through a gateway to a digital communication network such as the Internet, to obtain an application program from another node or a site.

2. Description of the Background Art

For communication between nodes connected to a network such as the LAN, generally, each node functions as a client server model. Generally, it is necessary for each node to obtain a server application or a client application before starting communication.

For example, in a network adapted for a specific standard enabling plug-and-play at home, the following method is commonly used to enable communication between appliances serving as nodes connected to the; network. More specifically, assuming that the communication takes place between two nodes, one node has a client program and a server program as a package. The other node receives one of the client program and the server program, whichever necessary, from the other node, and by the operation of the received program, communication with the aforementioned the other node is established.

In the above described technique, however, it is necessary that the appliance serving as one node must have the client program and the server program both installed. When the appliance actually operates only as a server and never operates as a client, installment of the client program in that appliance is unnecessary and wastes valuable storage area. Further, as the server program and the client program are held in the appliance at the time of shipment, the versions of these programs are determined at the time of shipment. As a result, there is a possibility that the latest program is not available for actual communication. If a software defect should be found after shipment or if the new version of the software is issued, it may be difficult to update the software.

For a home network, there is another problem as follows. In the home network, various and many appliances are supposed to provide applications or services specialized for respective appliances. This means that a client program or a server program particularly adapted for the special service is necessary. A server connected for the first time to the network cannot immediately know the existence of a node connected to the network that will serve as the client. Similarly, a node serving as a client that has been connected to the network cannot know that the new server is connected to the network, or what service would be provided by the server. It is still more difficult for each node to know in advance what client program is necessary to communicate with the server and from where such a client program can be obtained.

In the home network environment, it is necessary to ensure the so-called "plug-and-play" that does not require complicated operations of the user. More specifically, it is necessary that the server node and the client node on the home network obtain necessary programs respectively, so that communication can be started, when the server is connected to the home network.

A measure to solve such a problem should not cause excessive traffic on the network, and a situation in which such a solution imposes excessive load on a specific host must also be avoided.

Further, in order that communication can be started as soon as possible after the necessity of communication arises between a certain server and a client, it is desirable that each client or the server must hold the latest program as needed, or each client or the server is kept ready to obtain such a latest program when it becomes necessary. It has been difficult, however, by the conventional method.

Conventionally, even when the operating environment of a client is poor, it has been necessary to operate a dedicated client program on the client in order for the client to communicate with a certain server, and it does not matter how much resources are required. Accordingly, it has been the case that excessive load is imposed on some client nodes, or desired processing was not possible. The same applies to the server program. Namely, it is expected that the number of clients served by the server is small and the server does not have much resource. Even in such a case, if a large server program has been prepared in advance, the server must execute the program. This causes excessive load on the server node, hindering normal service.

SUMMARY OF THE INVENTION

Therefore, an object of the present invention is to provide a method of obtaining an application in a network, which eliminates hardware resources of appliances serving as nodes, and enables communication between nodes on the network by using softwares of the latest versions available at the time of communication.

Another object of the present invention is to provide a method of distributing an application on a network, effectively utilizing a hardware resource of an appliance serving as a node, and using a software of the latest version, when necessary, to enable communication between nodes on the network.

A still further object of the present invention is to provide a method of distributing an application in the network, effectively utilizing a hardware resource of an appliance serving as a node, and using a software of the latest version, when necessary, to enable communication between nodes on the network, and in which the load imposed on the network can be suppressed.

An additional object of the present invention is to provide a method of distributing an application in a network, using a software of the latest version adapted for a hardware resource of the appliance as its node, to enable communication between nodes on the network, and which can suppress load imposed on the network for that purpose.

According to a first aspect, the present invention provides a method of distributing a program at a network gateway, for distributing, to nodes connected to a network connected to a data communication network through the gateway, a program to be operated on each node. To the data communication network, a program distribution site is connected, which site holds a server program and a client program necessary for communication with a server using the server program, and has a function of distributing, upon request, a requested program to the node that issued the request. The method of distributing a program at the network gateway includes the steps of: preparing a management table storing management information for each of the nodes connected within the network; receiving, from a new server starting service provision on the network, management information related to the new server; updating the management table, in response to reception of the management information from the new server; requesting, in response to the reception of the management information from the new server, transmission of a server program for the new server and a client program for a client that will receive the new service, to a program distribution site specified by the management information; storing the server program and the client program transmitted from the program distribution site in response to the request in a storage provided in associated with the gateway; transmitting the server program stored in the storage to the new server; and, responsive to the transmission request of the client program to communicate with the new server, from a node connected to the network, specifying a necessary client program by making a reference to the management table, and transmitting the client program stored in the storage, to the node that has transmitted the transmission request.

Before the start of the service by the new server, the server program and the client program are transmitted to and stored in the gateway from the program distribution site. Prior to the communication, necessary, programs are transmitted from the gateway to the server node and the client node. Each node is not required to store any unnecessary program, and therefore the resources can effectively be utilized.

Preferably, a plurality of program distribution sites are connected to the data communication network, and the step of requesting transmission includes: in response to reception of the management information from the server, obtaining position information on the network of one or a plurality of program distribution sites specified by the management information on the network; selecting, from one or a plurality of program distribution sites, a program distribution site of which position information on the network satisfies a predetermined condition; and requesting transmission of the server program for the new server and a client program for the client which receives the new service, to the program distribution site selected as the position information thereof on the network satisfies the prescribed condition.

Among a plurality of program distribution sites, program transmission is requested to that one of which position information on the network satisfies a predetermined condition. An optimal program distribution site that satisfies the condition required for the network operating condition can be used, and therefore necessary programs can be transmitted at high speed to the gateway effectively utilizing the network.

Preferably, the program distribution site holds a plurality of programs for a certain application, and the step of requesting transmission includes: obtaining, in response to reception of the management information corresponding to the certain application from the server, program information of the plurality of programs from the program distribution site; and specifying a program to be received, based on the program information of the plurality of programs received from the program distribution site. Further, the step of requesting transmission includes the step of requesting transmission of the program selected as a server program for the new server, and a program selected as a client program for the client to receive the new service, to the program distribution site.

Where there are a plurality of programs prepared for an application, one is selected based on the program information. It is possible to select a program suitable for each node based on the factors such as program operating environment at the node and the number of clients in the network, and therefore resources can be used effectively.

According to another aspect, the present invention provides a method of distributing a program using a network gateway, for distributing, to nodes connected to a network that in turn is connected to a data communication networks through the gateway, a program to be operated on each node. To a large scale data communication network, a program distribution site is connected, that holds a server program and a client program necessary for communication with a server using the server program, and distributes, upon request, a requested program to a node that issued the request. The method of distributing a program using the network gateway includes the steps of: preparing a management table storing management information for each of the nodes connected within the network; receiving, from a new server that starts service provision on the network, management information related to the new server; responsive to transmission of the management information from the new server to the gateway, updating the management table; responsive to reception of the management information from the new server, requesting transmission of program information of the server program for the new server and the client program for a client that receives the new server, to a program distribution site specified by the management information; storing program information of the server program and the client program transmitted from the program distribution site in response to the request in a storage provided in association with the gateway; transmitting the program information of the server program stored in the storage to the new server; and transmitting, in response to a transmission request of the program information of the client program for communication with the new server, from a node connected to the network, specifying a necessary client program by making a reference to the management table, and transmitting the program information of the client program stored in the storage, to the node that issued the transmission request; whereby it becomes possible at a node that received the program information of the client program and the new server, whether or not the server program and the client program are to be obtained from the program distribution site.

According to a still further aspect, the present invention provides a method of distributing a program in a network gateway, for distributing, to nodes connected to a network that in turn is connected to a data communication network through the gateway, a program to be operated on each node, in which to a large scale data communication network, a program distribution site is connected, which site holds a server program and a client program necessary for communication with a server using the server program, and has a function of distributing, upon request, a requested program to a node that issued the request; the method of distributing a program in the network gateway includes the steps of: preparing a management table storing management information for each of the nodes connected within the network; receiving a program to be executed on a node connected within the network from a corresponding program distribution site and storing the program in a storage provided in association with the gateway; detecting update of the program stored in the program distribution site, updating the corresponding program stored in the storage with the new program stored in the program distribution site; requesting update of the program to a node that holds old version of the updated program; and transmitting, in response to reception of a transmission request of the program from the node holding the old version of the updated program, the corresponding program stored in the storage to the node that issued the transmission request.

According to a still further aspect, the present invention provides a method of distributing a program using a network gateway for distributing, to a node connected to a network that in turn is connected to a data communication network through the gateway, a program to be operated on each node, wherein to the large scale data communication network, a program distribution site is connected, which site holds a server program and a client program necessary for communication with a server using the server program and has a function of distributing, upon request, the requested program to the node that issued the request; the method of distributing a program using the network gateway including the steps of: preparing a management table storing management information for each of the nodes connected within the network; receiving program information of a program to be executed on the node connected within the network from a corresponding program distribution site and storing the program information in a storage provided in association with the gateway; detecting updating of the program stored in the program distribution site, and updating the corresponding program information stored in the storage with the program information of the new program stored in the program distribution site; and applying the program information of the new program to a node that holds an old version of the updated program and requesting updating of the program; whereby it becomes possible for the node that holds the old version of the updated program to determine whether the program is to be newly received from the program distribution site or not, based on the program information received from the gateway.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows a method of comparing IP addresses, related to the method of determining the optimal download site, in the seventh or eighth embodiment of the present invention.

FIG. 18 shows a management table used in the seventh and eighth embodiments of the present invention.

FIG. 19 shows a sequence of distributing a program to each node in the ninth embodiment of the present invention.

DESCRIPTION OF THE PREFERRED EMBODIMENTS

[First Embodiment]

Figure 1:
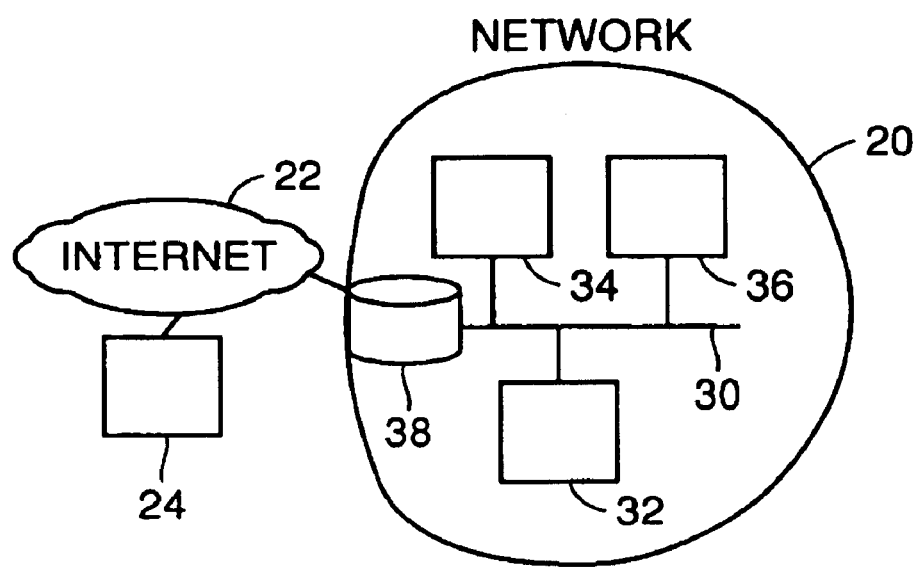
FIG. 1 shows an outline of the network system implementing each embodiment of the present invention.

Referring to FIG. 1, a network system 20 implementing the method of obtaining an application in accordance with the present embodiment includes a network 30 formed by an LAN to which nodes 32, 34 and 36 as various appliances are connected, and a gateway 38 for connecting network 30 to the Internet 22. To the Internet 22, a download site 24, which will be described later, is connected. The network system 20 is, in the present embodiment, a so-called home network system provided at home, and it is assumed that nodes 32, 34 and 35 are typical electric appliances for home use. A personal computer, of course, may be connected to the network.

The gateway 38 has, for example, a router function and an agent function that is capable of performing various processes by autonomous determination, by understanding user's intention as appropriate.

Typically, the download site 24 is a web site operated by a manufacturer of the appliances as nodes 32, 34 and 36, for distributing a program to operate the appliances manufactured and sold by the manufacturer. The latest server program and/or client program to be downloaded to nodes 32, 34 and 36 are at least held in download site 2:4. Download site 24 has a service function for downloading various programs to each node, in response to a request from the gateway 38, or by a distribution function provided by the download site 24.

In the network 20 shown in FIG. 1, the node operating as a server in the communication between nodes is assumed to be node 32. Node 32 is assumed to obtain the server program from an appropriate download service site through gateway 38. At the time of shipment of the appliance as node 32, node 32 simply holds ID (Identification) information identifying itself and information specifying the download site of the program. When connected to the network 20, node 32 registers the information held in itself with gateway 38.

It is assumed that nodes 34 and 36 operate as clients in the communication between nodes. Nodes 34 and 36 obtain, from gateway 38, a client program at the time of connection to the network 20 or at the time of communication request to node 32, as will be described later. At the time of shipment of the appliances as nodes 34 and 36, these appliances hold only the ID information for specifying themselves. At the time of connection to network 20, nodes 34 and 36 register the information held in themselves with gateway 38.

Figure 2:
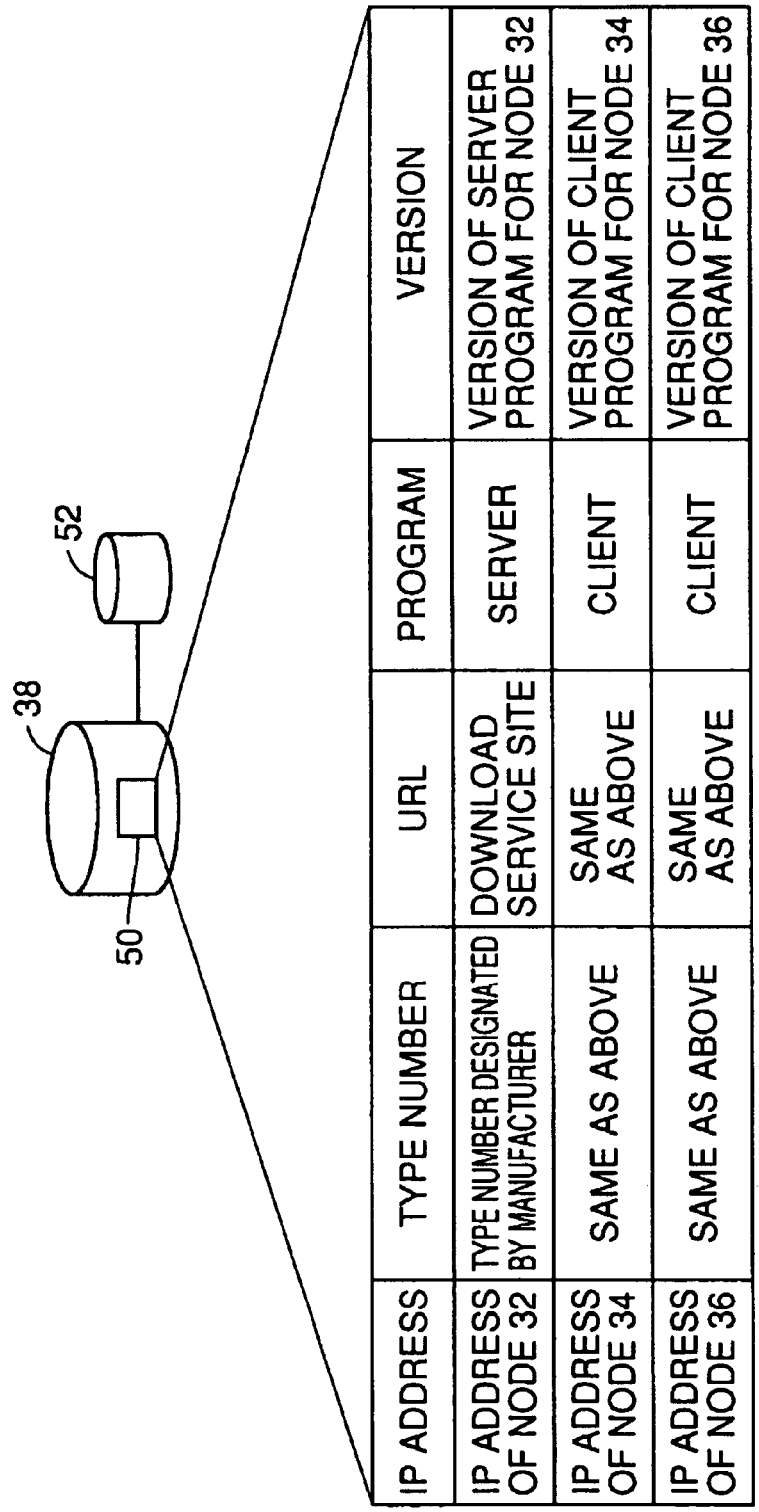
FIG. 2 shows a management table held by a gateway 38 in accordance with each embodiment of the present invention.

Referring to FIG. 2, gateway 38 holds a management table 50 and a storage 52 provided in association with gateway 38, for storing a program. Management table 50 includes, for each node, an IP (Internet Protocol) address, attribute information such as a type number of the appliance as the node, a URL (Uniform Resource Locater) of the download service site holding the program to be executed on the node, type of the program to be executed on the node, and version information of the program.

For example, for node 32, "server" is registered as the program type, and version information of the server program is registered as the version information. Similarly, for node 34, "client" is registered as the program type, and version information of the client program operated on node 34 is registered as the version information.

In the following, the procedure for obtaining an application at each node on the network in accordance with the present embodiment will be described with reference to FIGS. 3 and 4.

Figure 3:
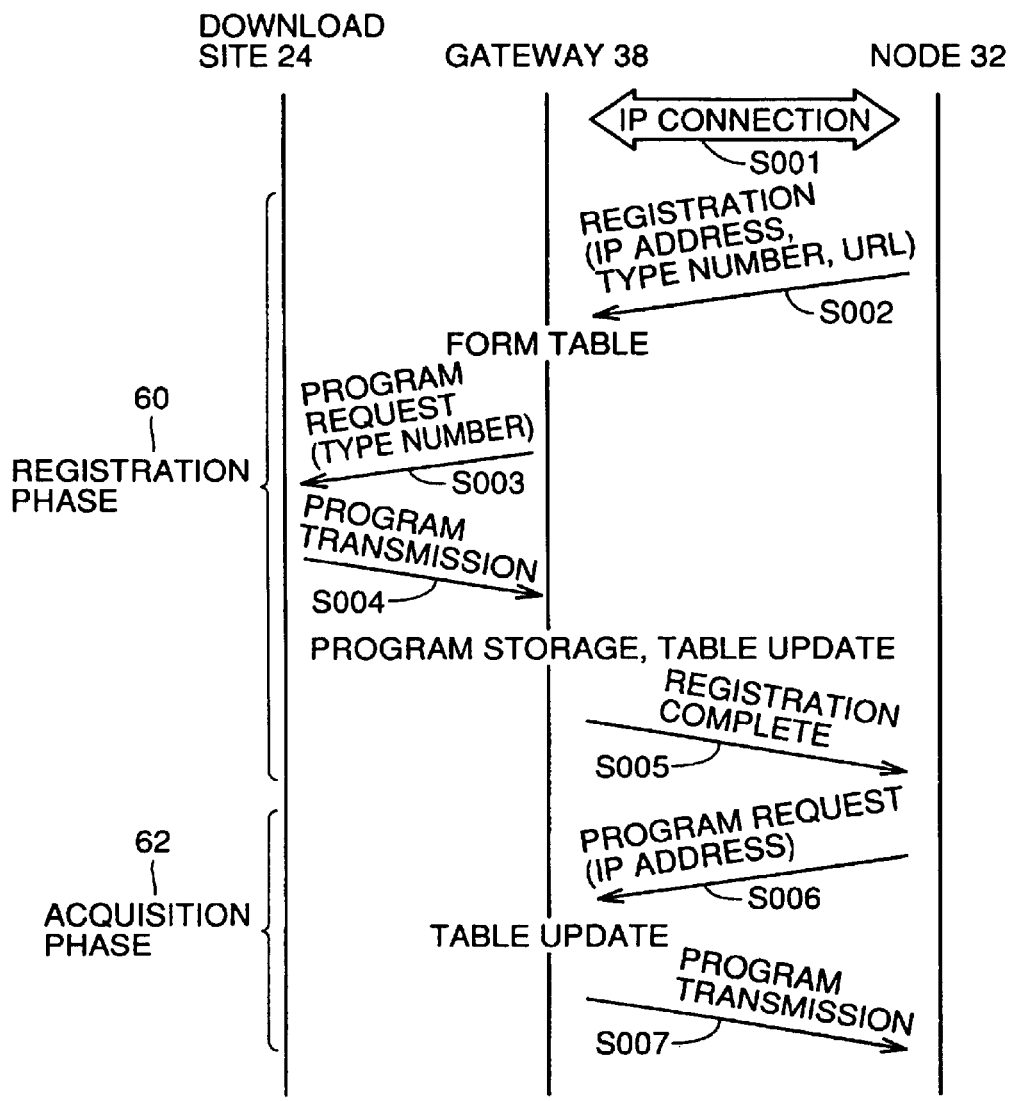
FIG. 3 shows a sequence for registering a program in gateway 38 and obtaining a program for a server node (node 32) in accordance with the first embodiment of the present invention.

The registration phase 60 shown in FIG. 3 starts when node 32 is connected to gateway 38 for the first time. When node 32 is connected to network 30, IP connection process takes place between node 32 and gateway 38 (S001). Thereafter, node 32 registers the IP address of node 32, type number of the appliance, and the URL of the download service site at which the server program to be executed on node 32 is registered, with the gateway 38 (S002).

Gateway 38 creates and holds entries corresponding to the information applied from node 32 in management table 50 held in itself. Thereafter, gateway 38 requests transmission of a server program, to a download site 24 specified by the URL in the entry corresponding to node 32, by designating the type number of the appliance as node 32, through Internet 22 (S003). Further, the gateway 38 stores the program transmitted in response to the program request from download site 24 in the storage 52 provided in association with gates 38, and updates the management table (S004). Finally, gateway 38 transmits a message indicating that program registration is complete, to node 32, and the registration process is terminated (S005).

The registration process by the clients such as nodes 34 and 36 is performed in the similar manner. It is noted, however, that for a client node, the program type is the "client" as shown in FIG. 2, and therefore the program transmitted from the download site 24 to gateway 38 is of a different type.

Next, referring to an acquisition phase 62 shown in FIG. 3, the sequence for obtaining a server program by node 32 will be described. Node 32 requests download of the server program to gateway 38, specifying the IP address of itself (S006). Gateway 38 searches management table 50 in accordance with the designated IP address and identifies the corresponding program, and transmits the program (server program) to node 32 (S007). Node 32 receives the server program and stores the program in a storage, for example, a hard disk, of itself.

Figure 4:
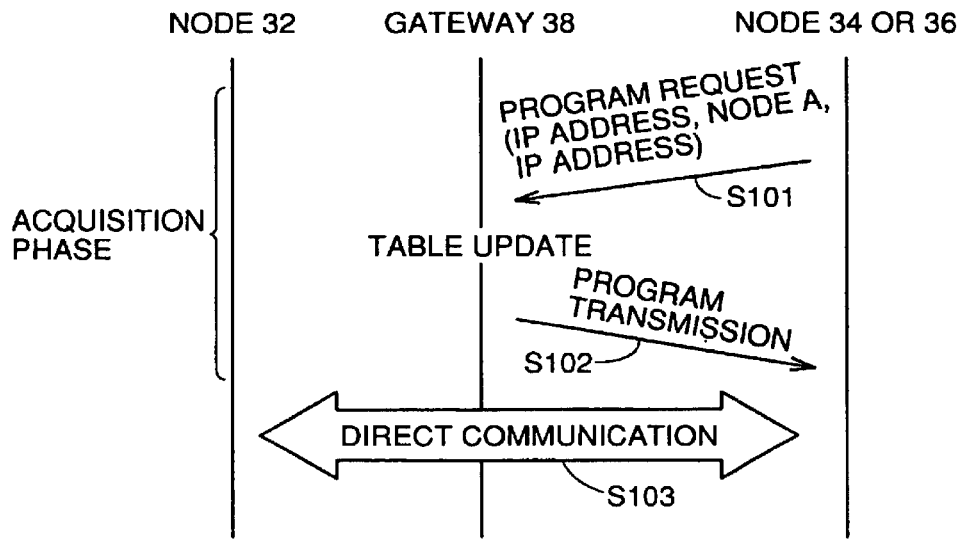
FIG. 4 shows a sequence for obtaining a program for a client node (node 34 or 36) in accordance with the first embodiment of the present invention.

Referring to FIG. 4, acquisition of the client program by a client node such as node 34 or 36 will be described. In the following, for simplicity of description, an example will be described in which node 34 obtains a client program. Node 34 requests download of a client program to gateway 38, specifying IP address of itself and IP address of node 32 as a partner of the communication (S101). Here, it is assumed that gateway 38 has the information stored in management table 50 held in itself made public by using the WWW (World Wide Web) technique, and that it is possible for client node 34 or 36 to know the existence of the server within the same network 20 as itself, IP address of the server and information of the service provided by the server, by making a reference to the information. If client node 34 knows the IP address of the server in advance, it is possible for the client node 34 to know what service and function can be provided by the server, to the gateway 38, by using the address. Thus, the client node can obtain the client program in accordance with the information thus obtained.

Again referring to FIG. 4, gateway 38 specifies the corresponding program by searching the management table 50 in accordance with the program request (S101) from node 34, and transmits the specified client program to node 34 (S102). Node 34 receives the client program, and stores it in an appropriate storage. Thereafter, it is possible for node 34 to directly communicate with node 32 (S103).

In the present embodiment, node 34 obtains without fail a client program if necessary, prior to the communication with the server. Therefore, when a new server is connected to the network system 20, or when a server that has been connected the network system 20 starts provision of a new service, gateway 38 notifies such information to each client within the network system 20, and therefore it is possible for each client to know the addition of the new server or start of the new service by the server in accordance with the notification, and to receive the service.

For example, after a new server is connected to the network system 20, gateway 38 may perform the sequence shown in FIG. 3 to obtain the server program and the client program from the download site, and the gateway may notify connection of the new server to each node connected to the network system 20 shown in FIG. 1. Upon reception of the notification, it is possible for each client node to notify existence of the new server to the user, by giving an indication that a new server is available, on a display of the appliance as the node, for example. If the new service becomes necessary at a client node thereafter, the client node can obtain the client program necessary for communication with the server, by performing the sequence shown in FIG. 4. In this manner, in correspondence to new connection of the server to the network system, it is possible for the client node to obtain the client program for communication with the server, as needed.

In the present embodiment, an example has been described in which after the server program is stored in the gateway 38, node 32 obtains thee server program in correspondence thereto. The present invention is not limited to such a sequence only. For example, if only the server program is registered with the gateway 38, it is possible to obtain the server program at any time as desired by the node 32. The sequence in that case is the same as that shown in FIG. 4.

There may be such a case in that node 34 has had a communication with node 32 in the past, and hence node 34 already holds a necessary client program. In that case, node 34 may make an attempt to directly communicate with node 32, without requesting the client program to gateway 38 immediately. If communication between node 34 and node 32 fails because of a version difference, for example, the node 34 may then request the client program to gateway 38, so as to obtain the client program.

As described above, by the network system of the present invention, each node uses only the information such as the URL of a distribution source to obtain a server program or a client program, and each node does not hold the program itself. When it becomes necessary to communicate, the node accesses a download site 24 based on the URL of the download service site held in itself, using information such as the type number of the appliance itself as a key, and downloads necessary information. Therefore, it is possible for each node to use the latest software for every communication. Further, it becomes unnecessary to store a client program in a node that operates only as a server. Thus, storage area of the node can be saved.

Further, a server which is newly connected to the network 30 does not at all require information of the client node as the partner of communication. Simply by connecting to the network 30 and exchanging information with gateway 38, it is possible for the new server to communicate with any client node within the network system 20.

Similarly, it is unnecessary for the client node to know the information of the program necessary for communication with each server, or information of an existence of a server in the network system 20. Further, simply by connecting to the network 30 and exchanging information with the gateway 38 without any special concern as to which client program should be download from which download site, it is possible to communicate with any server within the network system 20.

In the system of the present embodiment, for a plurality of nodes on the network system 20, gateway 38 obtains and holds programs collectively from a download site 22. Therefore, as compared with the method in which each node obtains a program from download site 24, the traffic can be reduced. As each node can obtain the program from gateway 38, the total time necessary for obtaining the programs can be made shorter than when each node obtains a program from the download site 24.

In the first embodiment shown in FIGS. 3 and 4, when client node 34, for example, communicates with server 32, the client node requests and receives a program from gateway 38 in advance. The present invention, however, is not limited to such an operation sequence. When the node 34 already holds a client program, it is possible to confirm whether the client program held by the client node is appropriate for communication with the server or not at gateway 38, every time the necessity of communication with the server arises. In that case, it is possible to confirm whether the version of the server program held by the server and the version of the client program are compatible or not, and whether attribute information necessary for information such as the IP address of the server has been changed or not. Thus, communication reliability can be improved. If it is impossible for the client to communicate with the server because of the difference of attribute information, for example, required for communication or difference of programs, it is possible to obtain the client program from the gateway 38, in accordance with the sequence shown in FIG. 4.

[Second Embodiment]

A second embodiment of the present invention will be described with reference to FIGS. 5 to 7. This embodiment is different from the first embodiment only in the sequence for the node to obtain an application. The outline of the network system and the contents of the management table held by the gateway in the present embodiment are the same as those shown in FIGS. 1 and 2, respectively. Therefore, detailed description thereof will not be repeated here.

Figure 5:
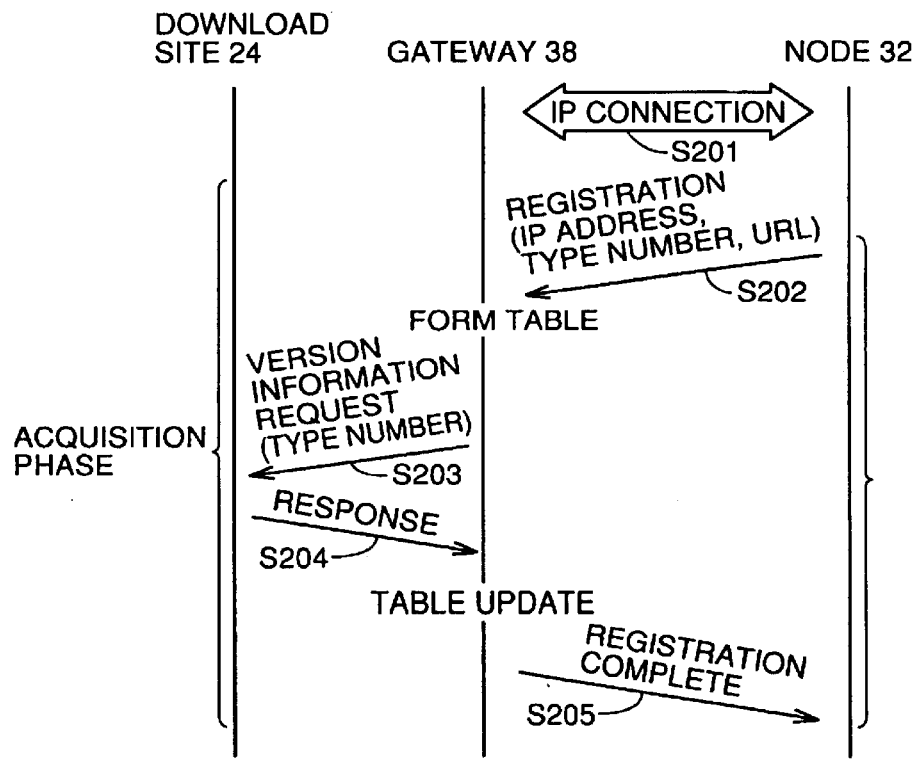
FIG. 5 shows a sequence for registering a program in gateway 38 in accordance with the second embodiment of the present invention.

Referring to FIG. 5, the sequence for registering version information of a program with the gateway 38 is performed in the following manner. First, the process starts when node 32 is connected to network system 20.

When node 32 is connected to network 30, an IP connection is established between node 32 and gateway 38 (S201). Thereafter, node 32 registers the IP address, appliance type number, and URL of node 32 with gateway 38 (S202).

In accordance with the information received from node 32, gateway 38 creates and holds new entries in management table 50. Gateway 38 requests version information of a server program and version information of a client program, by designating the type number of the appliance received from node 32, to a download site on the Internet (S203). Download site 24 transmits the version information in response to the request (S204), gateway 38 updates the version information of management table 50 shown in FIG. 2 with the transmitted version information, transmits a notification of registration complete to node 32 (S205), and the registration process' is terminated.

Registration of various information of the client node is performed in the similar manner as the process shown in S202 of FIG. 5.

Figure 6:
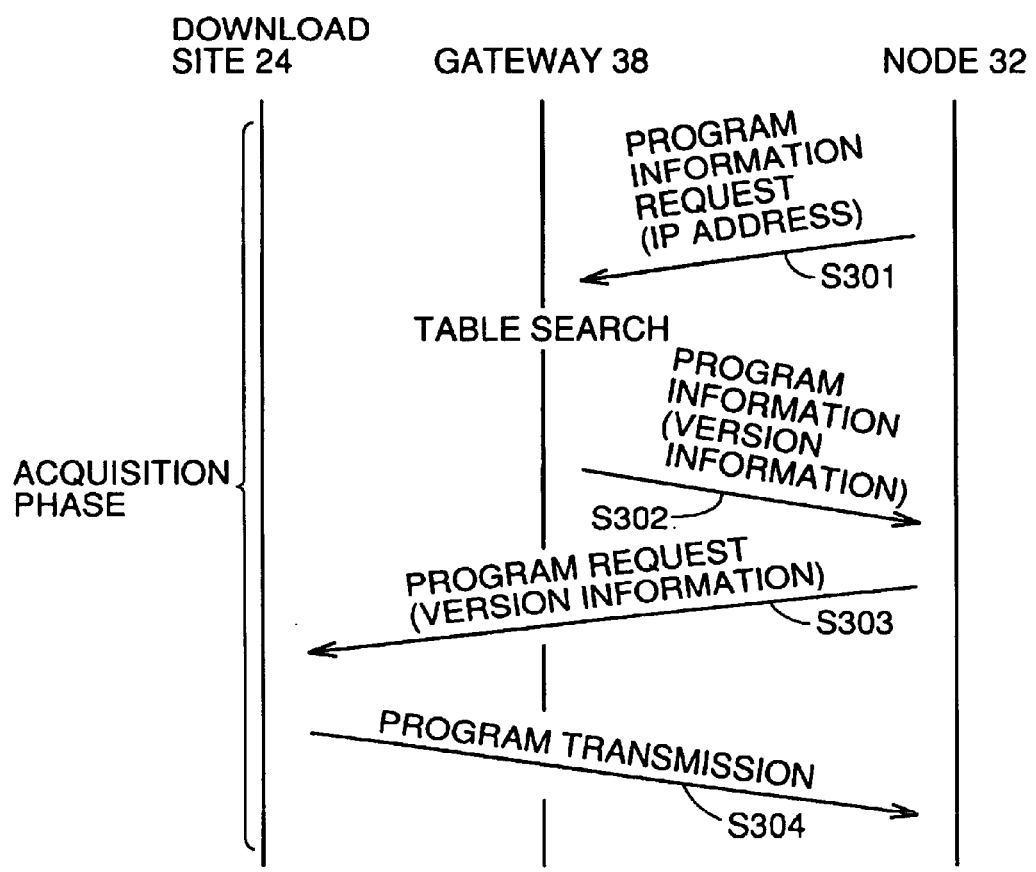
FIG. 6 shows a sequence for obtaining a program for a server node (node 32) in accordance with the second embodiment of the present invention.

Referring to FIG. 6, the process for node 32 to obtain the server program is performed in the following manner. Node 32 requests transmission of version information of the server program stored in gateway 38, by designating the IP address of itself, to gateway 38 (S301).

In response to the request, gateway 38 searches management table 50, and transmits version information of the server program corresponding to node 32 (S302).

Upon reception of the version information from gateway 38, node 32 determines whether the version of the server program stored in gateway 38 is newer than the version of the server program stored in node 32 or not. If the version information stored in gateway 38 has been updated and node 32 needs the server program of the new version, the node requests transfer of the server program to download site 24, by designating the necessary server program and the version information thereof (S303). In response to the request, download site 24 transmits the designated version of the designated server program to node 32 (S304). In this manner, node 32 obtains the server program of the necessary version from download site 24.

Figure 7:
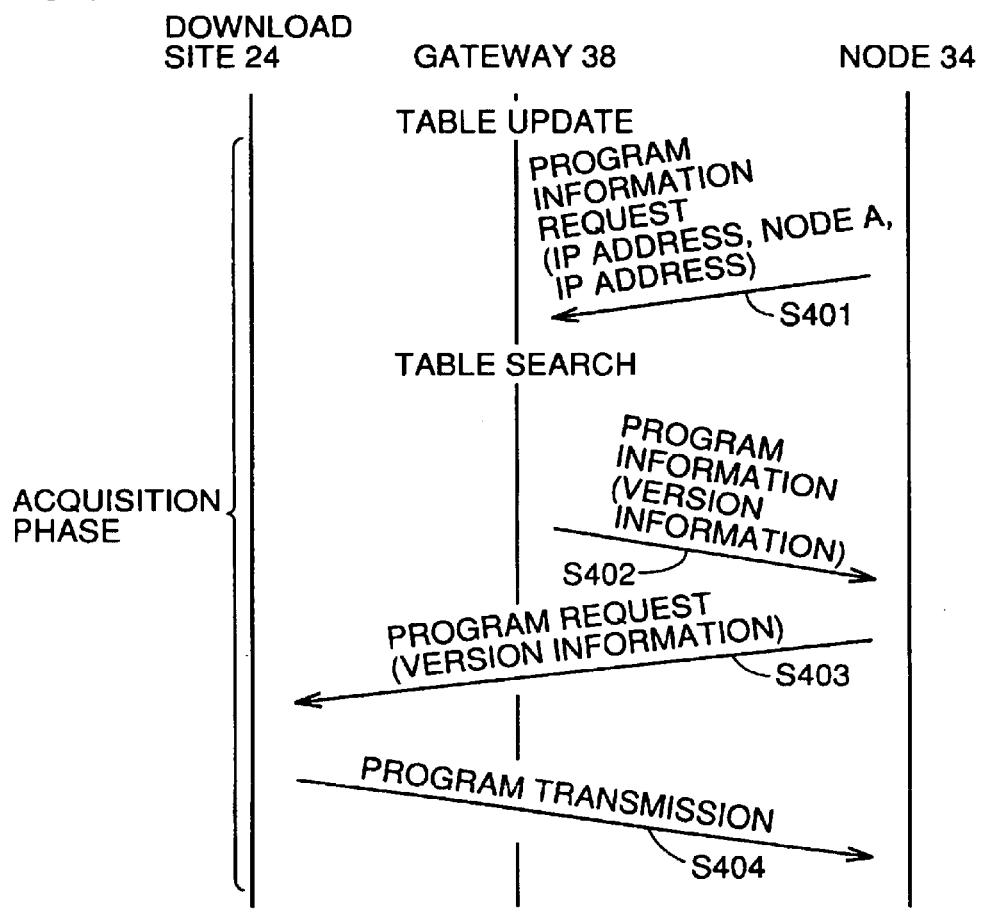
FIG. 7 shows a sequence for obtaining a program for a client node (node 34, 36) in accordance with the second embodiment of the present invention.

Referring to FIG. 7, the client node (for example, node 34) obtains the client program in the following manner. First, node 34 requests transmission of the version information of the client program, by designating the IP address of itself and the IP address of node 32 as the server, to gateway 38 (S401). Here, it is possible that gateway 38 makes public the information of nodes within the network and attributes of each node, from the attribute information of the nodes connected to the network to which it belongs, by the WWW technique, for example, in advance. As such information is made public, it is possible for a user of each client node to know what servers exist in the network and what their IP address are. Further, when a user of a client node knows in advance the IP address of the server as a partner of communication, it is possible to request gateway 38 to provide information as to what service or function can be expected from the server. Thus, it is possible for each client node to make a request of the client program for the service provided by each server, to gateway 38.

Again referring to FIG. 7, upon reception of the program information request, gateway 38 searches management table 50 for the version information of the client program required by node 34, and transmits the information to node 34 (S402). Upon reception of the version information, node 34 can determine whether the client program held therein should be updated to the new version or not. If it is necessary to obtain the client program, the node 34 transmits a request to download the client program to download site 24, by designating the client program and version information thereof (S403). In response to the program request, the program corresponding to node 34 is transmitted from download site 24 (S404). In this manner, it is possible for node 34 to obtain the necessary latest version of the client program.

As described above, in the system of the present embodiment, gateway 38 manages only the program version information. Before downloading the program, each node inquires the version of the necessary program to gateway 38 and obtains the version information. After comparing the version information and version information of the program held therein, the program is obtained from the download site 24 when it is necessary. As the program is transmitted only when it is necessary to obtain the program, the traffic on the network can be reduced.

As in the first embodiment, in the present embodiment, the program for node 32 may be obtained immediately after the version information is registered with the gateway 38 when node 32 is connected to network 30. Alternatively, after registration of the version information, the server program may be obtained at any time desired by the node 32. The client program for nodes 34 and 36 may be obtained at the time of communication with node 32, or may be obtained when these nodes are connected to network 30.

In the present embodiment, gateway 38 does not obtain a program from download site 24. Simply by maintaining the latest version information of each program, it is possible for the gateway 38 to notify to each node on the network, information necessary to determine whether the program at each node should be updated or not. Thus, the memory necessary for the gateway 38 can be reduced, and the load on the gateway 38 can also be reduced.

In the second embodiment, when node 34 as a client node communicates with the server, a request for the program information of the necessary program is transmitted to gateway 38. The present invention, however, is not limited to such an embodiment. In order for the node 134 to obtain a client program, it is possible for the gateway 38 to notify to each node that a new server is connected to the network, or that an existing server starts a new service. By such a notification, it becomes possible for the user at each client node to know the existence of the new server or the new server service.

For example, after the server is connected by performing the sequence shown in FIG. 3 and the gateway 38 obtains the server program and the client program from download site 24, the gateway 38 may notify connection of the server to each node of network system 20 such as shown in FIG. 2. Each client node receiving such a notification may notify connection of a new server or start of a new service to the user of each node, by displaying a message that a new server is available, for example, on a display or the like of each node. When it becomes necessary for the user of a client node to receive the service provided by the server, it is possible to obtain a necessary client program by starting the sequence shown in FIG. 6 from that client node. More specifically, different from the first embodiment, it is possible to set, in correspondence with the connection of a new server to the network, that each client node obtains the client program necessary for receiving the service by the server from the download site.

In such a case, after the sequence shown in FIG. 6 is completed, it is necessary for gateway 38 to confirm whether each node on the network has obtained the program, and to manage the attribute information of the node together. This can be realized in a simple manner. For example, gateway 38 may confirm each node, or each node may notify the gateway 38 that the corresponding program has been obtained.

[Third Embodiment]

Figure 8:
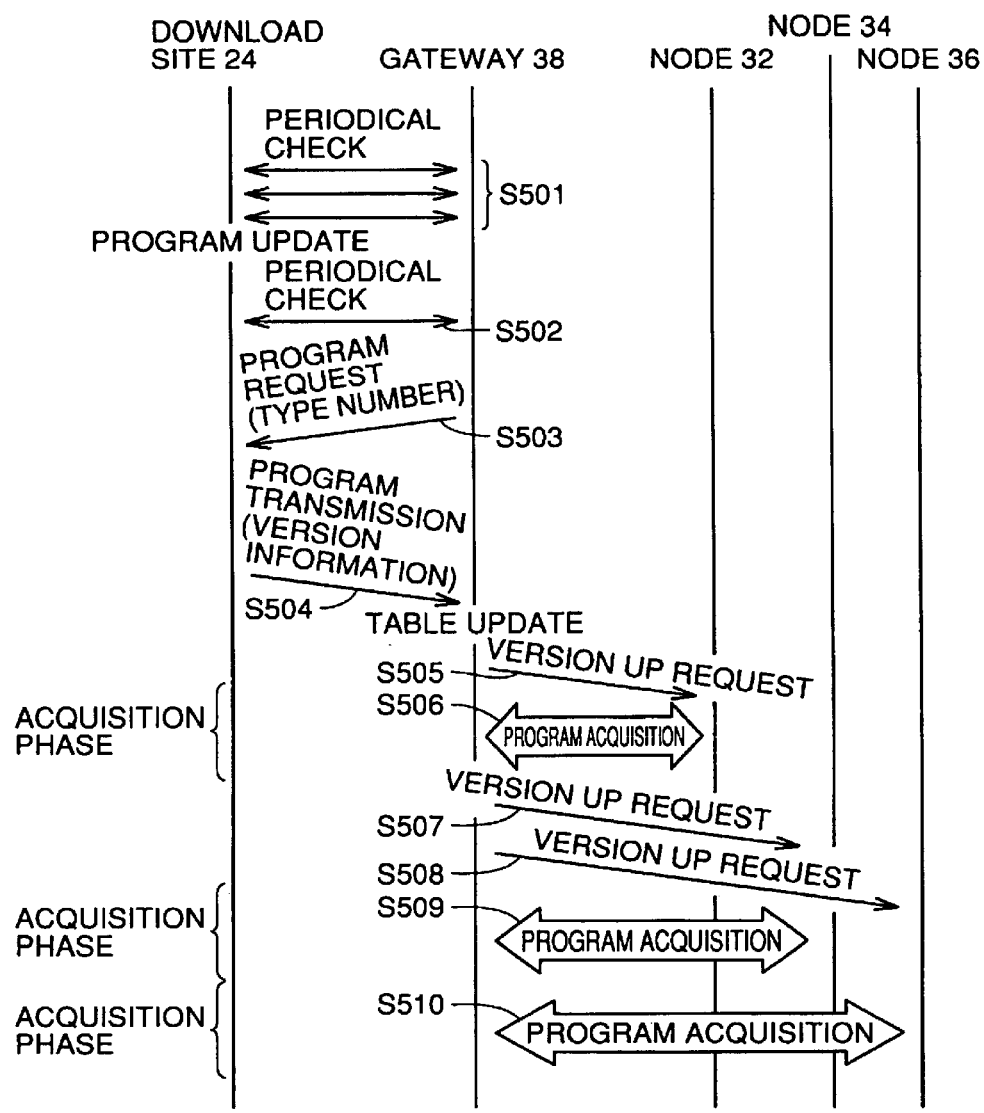
FIG. 8 shows a sequence for updating each node program in accordance with the third embodiment of the present invention.

In the network system, in accordance with the third embodiment described in the following, every time a program is updated at download site 24, the program at each of the nodes 32, 34 and 35 is updated. FIG. 8 shows a communication sequence between each of download site 24, gateway 38 and nodes 32, 34 and 36 in the third embodiment.

Referring to FIG. 8, gateway 38 periodically checks whether the version of each node program is updated or not, in download site 24 (S501). When a version of a program for each node is updated at download site 24, it is possible for gateway 38 to know that the program version is updated, by the periodical check thereafter (S502). In response to the version update, gateway 38 requests transmission of the program of the new version, by designating the type number of the appliance as the node corresponding to the program, to the download site 24 (S503).

In response to the request, download site 24 transmits the updated server program and the client program to gateway 38 (S504).

Upon reception of the program from download site 24, gateway 38 requests version up of the server program, to node 32 (S505).

Node 32 determines whether a condition allowing update of the program is satisfied or not, including confirmation as to whether the node 32 is not communicating with other node, and when the condition is satisfied, obtains the server program of the new version from gateway 38 (S506).

Gateway 38 further requests version up of the client program to all client nodes (node 34 and 36) in the management table, after the node 32 is updated (S507, S508). Nodes 34 and 36 obtain the new version of the client program from gateway 38 (S509, S510).

In the system of the present embodiment, gateway 38 monitors the download site 24 so as to grasp the version number of the latest versions of the server program and the client program for each node which are under management of itself, periodically. If it becomes necessary to update the version of the program for each node, gateway 38 notifies each node to that effect. Thus, each node can obtain the server program for the client program of the latest version without any excessive load. Further, as the versions of the server program and the client program match with each other constantly, it is unnecessary for each client node to confirm whether the program version coincides, before starting communication with the server.

In the present system, periodical checking of download site 24 is performed by the gateway 38, so as to detect version up of the program. When download site 24 detects updating of a program held therein and notifies the detected update to the related gateway 38, by contrast, it becomes necessary for the download site 24 to manage the information of the gateway of each network. By the method of the present embodiment, however, such a management load on the download site can be avoided.

[Fourth Embodiment]

In the system in accordance with the fourth embodiment, based upon the version information periodically obtained from the download site, gateway 38 requests version up at each node, and each node performs the process to obtain the necessary program from the download site separately.

Figure 9:
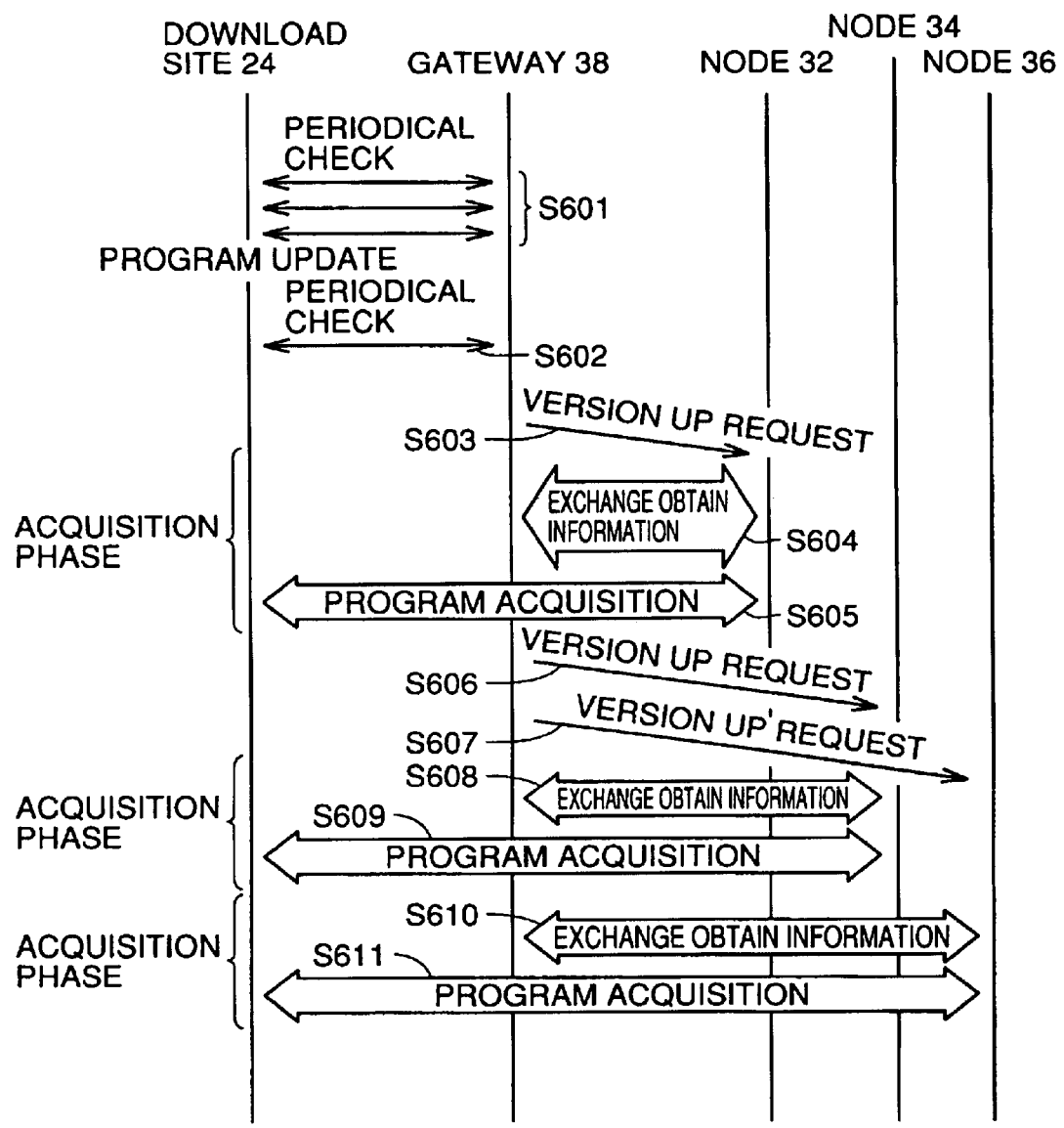
FIG. 9 shows a sequence for updating each node program in accordance with the fourth embodiment of the present invention.

Referring to FIG. 9 in the system of the present embodiment, gateway 38 periodically checks whether the version of a program of ea ch node is updated or not at download site 24 (S601). When the version of any program is updated at download site 24, gateway 38 comes to know the update of the version of the program by the periodical check thereafter (S602). In response to the update of the program version, gateway 38 requests the node 32 as the server to update the version of the server program (S603).

In response to the request, node 32 confirms whether the information allowing updating is satisfied or not, including that the node is not communicating with other node, notifies taking of the server program to gateway 38, and in addition, receives the version information of the necessary program (S604). Further, node 32 requests transmission of the updated server program obtained from gateway 38, and stores the transmitted program (S605).

After the server program is updated at node 32, gateway 38 requests all the client nodes, for example, nodes 34 and 36, in the management table 50, to update the version of each client program (S606 and S607). Nodes 34 and 36 notify taking of the client program to gateway 38, respectively, and obtain version information of the necessary program (S608, S610). Further, nodes 34 and 36 request transmission of the updated client program to download site 24, based on the information obtained from gateway 38, and store the transmitted program (S609 and S611).

After the sequence shown in FIG. 9, it is necessary for gateway 36 to confirm whether each node within the network system 30 has obtained the program, and to manage attribute information in the management table 50. For this purpose, gateway 38 may confirm each node as to such information, or each node may notify the gateway 38 after each node obtained the program.

In the system in accordance with the fourth embodiment also, gateway 38 periodically monitors whether the versions of the server program and the client program at respective nodes have been updated. Every time the version of each program is updated, it makes a request for updating to the node as needed. Therefore, it is possible for each node to obtain the server program or the client program from download site 24 when a version up request is received from gateway 38, and hence it is possible to always maintain the latest version of the program. It is unnecessary for each node to confirm compatibility of program versions when making a communication with other node, and therefore load on each node can be reduced.

In the present embodiment, as in the third embodiment, the gateway 38 confirms by periodical check of download site 24 whether the program in download site 24 has been updated or not. Therefore, in this embodiment also, management load to manage the information of the gateway at each network at download site 24 can be reduced.

[Fifth Embodiment]

Figure 10:
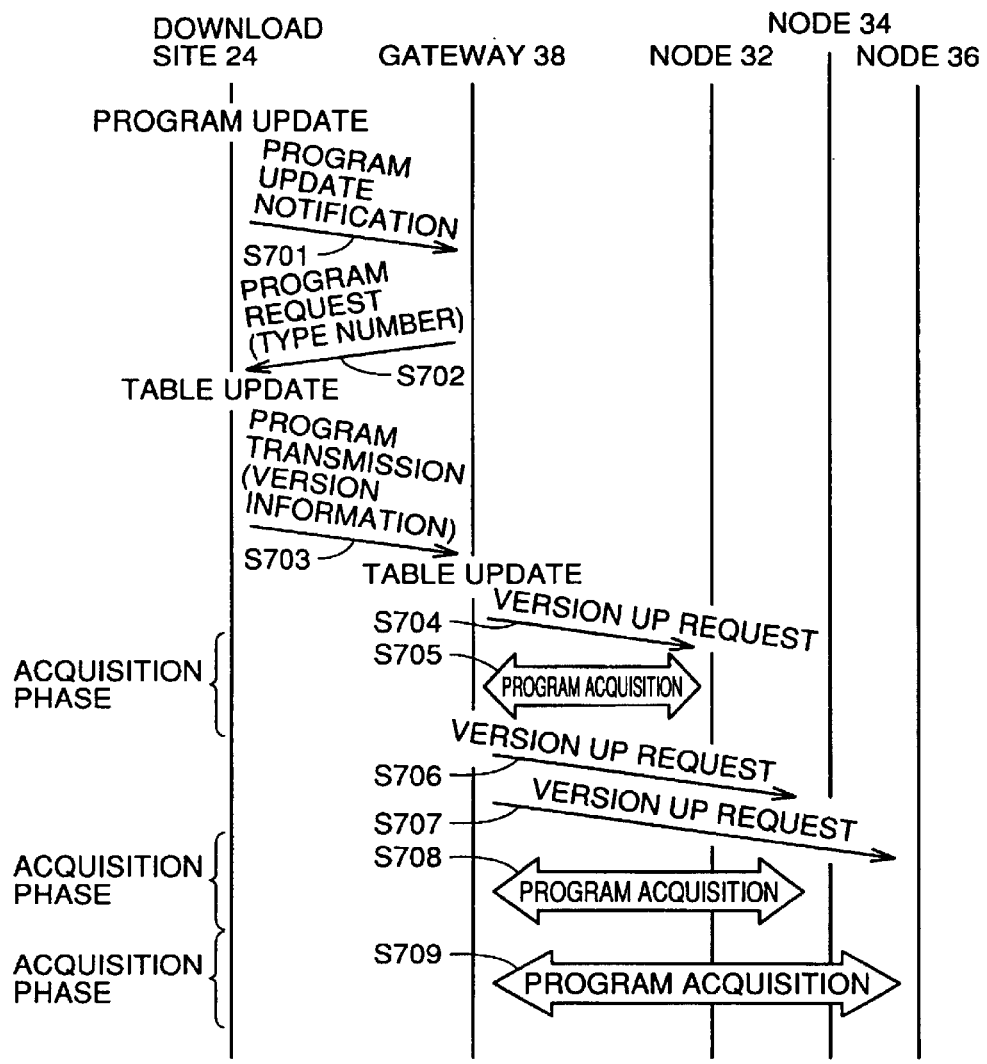
FIG. 10 shows a sequence for obtaining a program at each node of the network in accordance with the fifth embodiment of the present invention.

FIG. 10 shows a communication sequence between each of the nodes, gateway and the download site in the network system in accordance with the fifth embodiment of the present invention. In the system in accordance with the fifth embodiment, each node performs the process to obtain a program, based on a program update notification issued from download site 24 to gateway 38.

Referring to FIG. 10, assume that a program corresponding to node 32, 34 or 36 has been updated at download site 24. Download site 24 transmits an update notification of the program to gateway 38 (S701). Upon reception of the update notification, gateway 38 requests transmission of the program to download site 24 by designating the type number of the appliance as the node, corresponding to the updated program (S702). In response to the program request, download site 24 transmits the updated server program and the client program to gateway 38 (S703). At this time, version information related to each program is also transmitted, and gateway 38 updates the contents of management table 50 in accordance with the transmitted version information.

Thereafter, gateway 38 requests updating of the server program, to node 32 as the server node (S704). Node 32 determines whether the condition allowing updating is satisfied or not, and if the condition is satisfied for updating, obtains the updated server program from gateway 38 (S705).

After the program of node 32 is updated, gateway 38 request all the client nodes, for example nodes 34 and 36, within the management table 50 managed by itself, to update the client program (S706 and S707). In response to the request, nodes 34 and 36 obtain the updated client program from gateway 38 (S708, S709).

According to the present embodiment, when a program is updated at download site 24, program update is notified to gateway 38. In response to update notification, gateway 38 receives the new program from download site 24, and the program is transmitted from gateway 38 to each node. It is possible for each node to always obtain the server program or the client program of the latest version. It is possible for each node to communicate with a desired node immediately, by operating the program held therein.

In the present embodiment, in order for the gateway 38 to detect updating of the program, an update notification is given from download site 24 to gateway 38. As compared with the method in which gateway 38 periodically checks the download site 24, periodical transmission/reception of confirmation message is unnecessary. Therefore, unnecessary traffic can be avoided in the present embodiment. What is necessary for download site 24 is simply to monitor updating of the programs stored in the memory of itself, and hence the time from updating to the notification of updating to gateway 38 can be made shorter.

[Sixth Embodiment]

In the network system in accordance with the sixth embodiment, when a version of a program is updated at a download site, version up request is made through gateway 38 to each node. In response to the request, each node directly obtains the program from download site 241.

Figure 11:
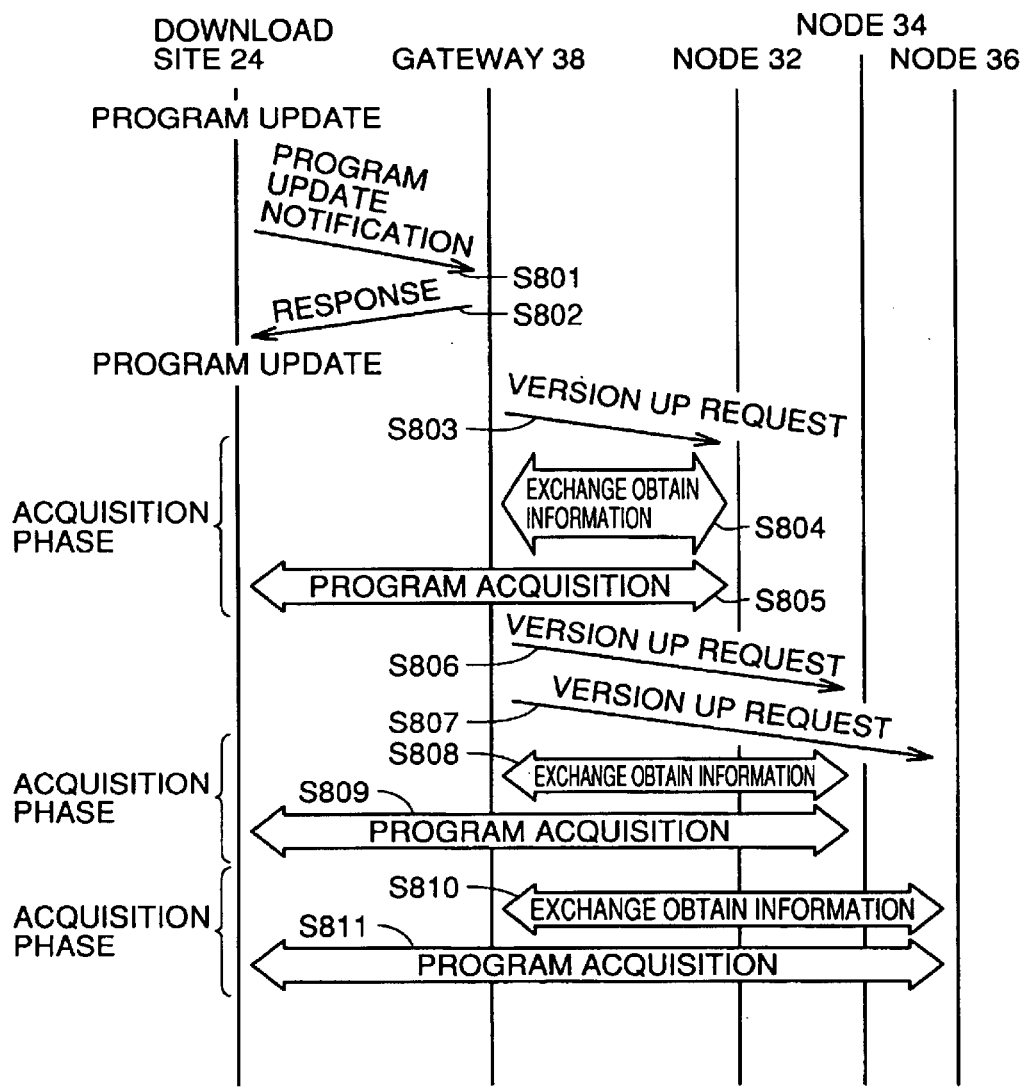
FIG. 11 shows a sequence for obtaining a program by each node of the network in accordance with the sixth embodiment of the present invention.

Referring to FIG. 11, assume that a program corresponding to each node is updated at download site 24. Download site 24 transmits a program update notification to gateway 38 (S801). Upon reception of the program update notification, gateway 38 returns a response acknowledging reception of the program update notification, to download site 24 (S802).

Thereafter, gateway 38 requests node 32 as the server node, to update the server program (S803). Upon request, node 32 determines whether the conditions for updating are satisfied or not. If updating is possible, it receives information necessary for updating the server program, from gateway 38 (S804). Based on the information obtained from gateway 38, node 32 requests transmission of the updated server program to download site 24, and stores the transmitted program (S805).

After the program is updated at node 32, gateway 38 requests all the client nodes, for example, nodes 34 and 36, in the management table 50 managed by itself, to update the client program (S806 and S807). Each of the nodes 34 and 36 receives information necessary for obtaining the client program by the communication with gateway 38 (S808 and S810) and based on the received information, transmits a request for the updated client program to download site 24, and stores the transmitted program (S809 and S811).

In the system of the present embodiment also, when a program is updated, download site 24 notifies updating of the program to gateway 38. In response to the update notification, gateway 38 requests version up of the program to each node. In response to the request, it is possible for each node to obtain the latest program from download site 24. Therefore, each of the nodes 32, 34 and 36 can immediately obtain the latest server program or the client program immediately after the updating. As the program at any node is maintained at the latest version, it is possible for each node to start communication immediately with a partner node, when necessary.

After the sequence of FIG. 11, it becomes necessary for gateway 38 to confirm whether each node of the network has obtained the program, and to manage attribute information of each node. This may be done when gateway 38 confirms information to each node, or when each node notifies gateway 38 that the program is obtained.

In the system of the present embodiment also, a method is used in which the download site notifies to the gateway 38, in order to detect updating of the program, as in the fifth embodiment. As compared with the method in which gateway 38 periodically checks download site 24, traffic caused by the periodical confirmation message can be avoided. What is necessary for download site 24 is simply to monitor updating of the program stored in the memory of itself, and the notification can be issued to the gateway 38 immediately after the updating of the program.

[Seventh Embodiment]

Figure 12:
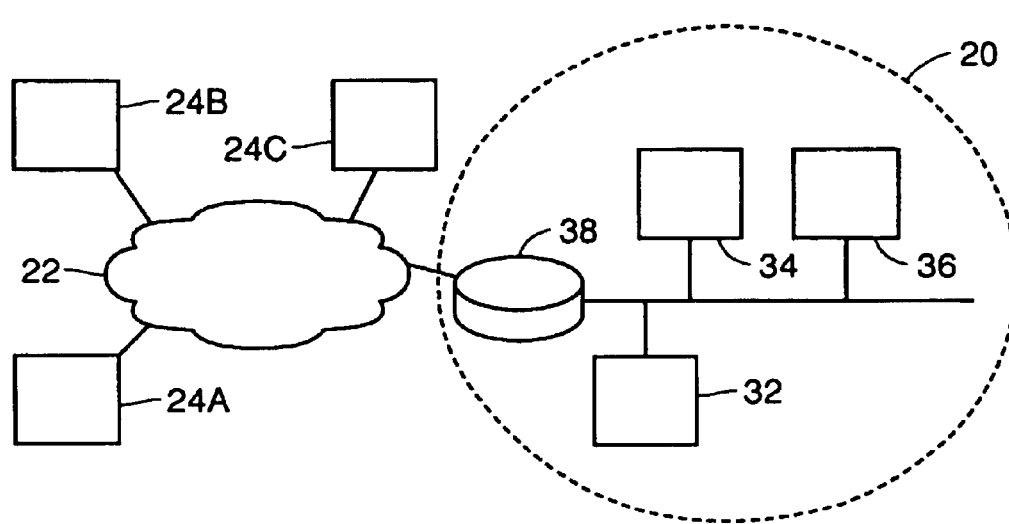
FIG. 12 shows an outline of a network system implementing the seventh and eighth embodiments of the present invention.

FIG. 12 shows a network system 20 implementing the method in accordance with the seventh embodiment of the present invention and related sites. In FIG. 12, what is different from FIG. 1 is that a plurality of download sites 24A, 24B and 24C are connected as download sites distributing programs, to the Internet 22.

In the method of the present embodiment, the plurality of download sites 24A, 24B and 24C hold the server programs and the client programs such that the same program can be supplied in response to a request from gateway 38 or from nodes 32, 24 and 36.

In the present embodiment, each node obtains the program in the following manner. Each node obtains an IP address by DHCP (Dynamic Host Configuration Protocol) at the time of network connection, and uses the obtained IP address as ID information identifying itself. The node serving as a server registers the type number of the appliance as the node which the appliance has in advance, position information of the download site (URL or IP address) and ID information (IP address) with gateway 38. A node as a client registers attribute information (management information) including the type number of the appliance as the node, which the node has in advance, and ID information (IP address) with gateway 38.

Gateway 38 inquires which one is the optimal download site to the download site described in the attribute information of node 32 (node as a server) using position information (IP address) of itself. The download site which receives the inquiry holds position information (URL or IP address) of all the download sites, specifies the optimal download site among download sites 24A to 24C and notifies to gateway 38.

Three examples of the method when download site 24A specifie's an optimal download site to gateway 38, where position information of download site 24A is described in the column of download site of management information at node 32, will be described in the following.

In the first example, gateway 38 inquires download site 24A of the optimal download site, with reference to the information containing IP address of the gateway itself. Download site 24A measures the time necessary for transmitting a packet from download site 24B or download site 24C to gateway 38, or measures the number of hops of the packet on the transmission path, and using the results, download site 24A specifies the optimal download site.

Generally, in order to measure the time necessary for packet transmission or the number of hops between two hosts on the internet, an application such as Ping or Traceroute is used from one to the other host. Such application is used in the present embodiment also. Ping is a program in which ICMP (Internet Control Message Protocol) message is transmitted/received between two hosts and the time necessary therefor is measured. Traceroute is a program in which when a packet is transmitted between two hosts, packet arrival time is returned from every router relaying the packet, to the source of transmission.

Ping or Traceroute is executed from download site 24 via download site 24B to gateway 38. By subtracting the time necessary for transmission or hop number, between download site 24A and download site 24B, the time for transmission/reception or the hop number from download site 24B to gateway 38 can be measured. In this manner, the transmission/reception time and/or hop number is measured for every download site and the results are compared with each other. Thus, it is possible for download site 24A to find from all the routes from the download site to gateway 38, the shortest route and the most stable route at that time point.

Figure 13:
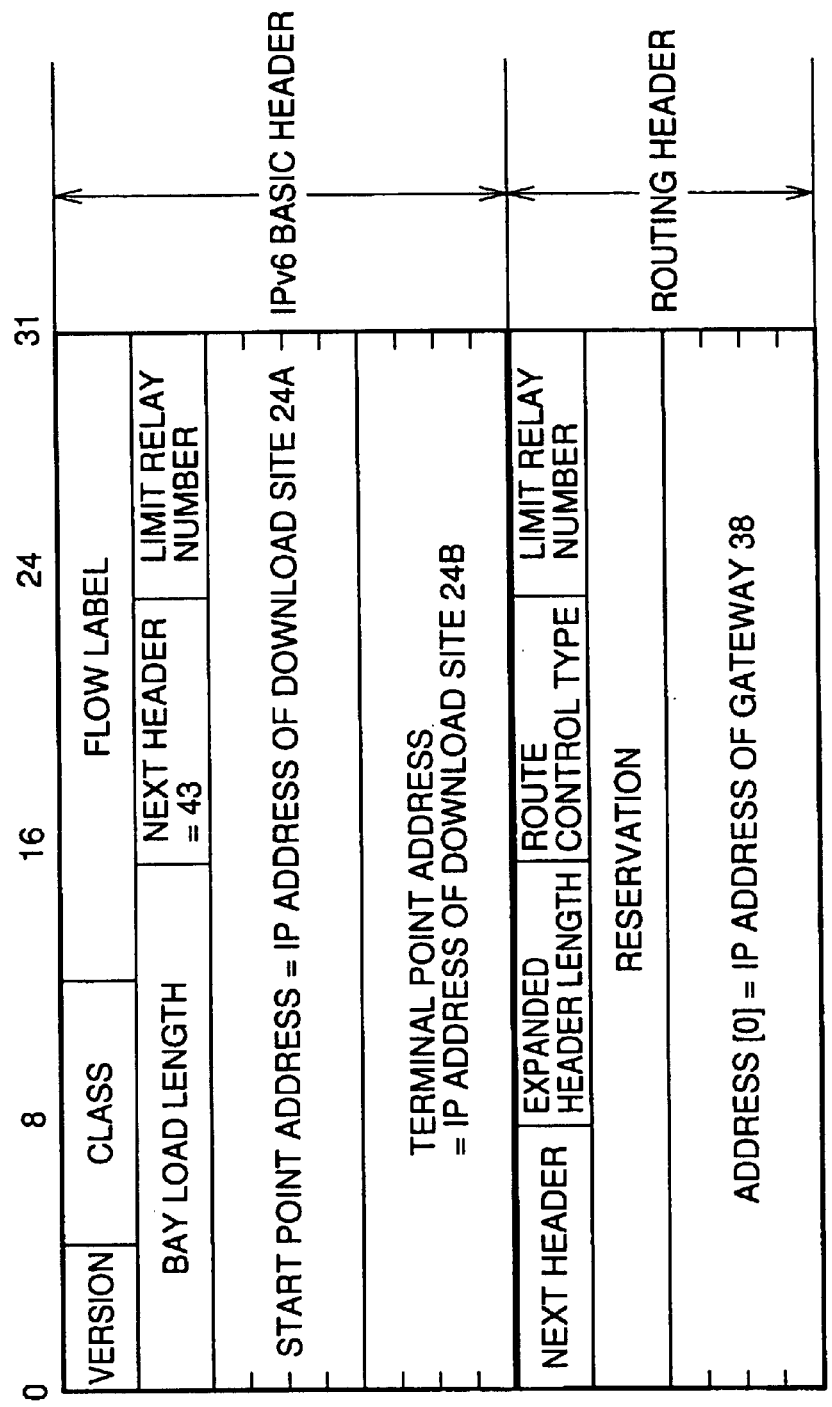
FIG. 13 shows IPv6 packet header format used for measuring packet transmission/reception time in the seventh embodiment of the present invention.
Figure 14:
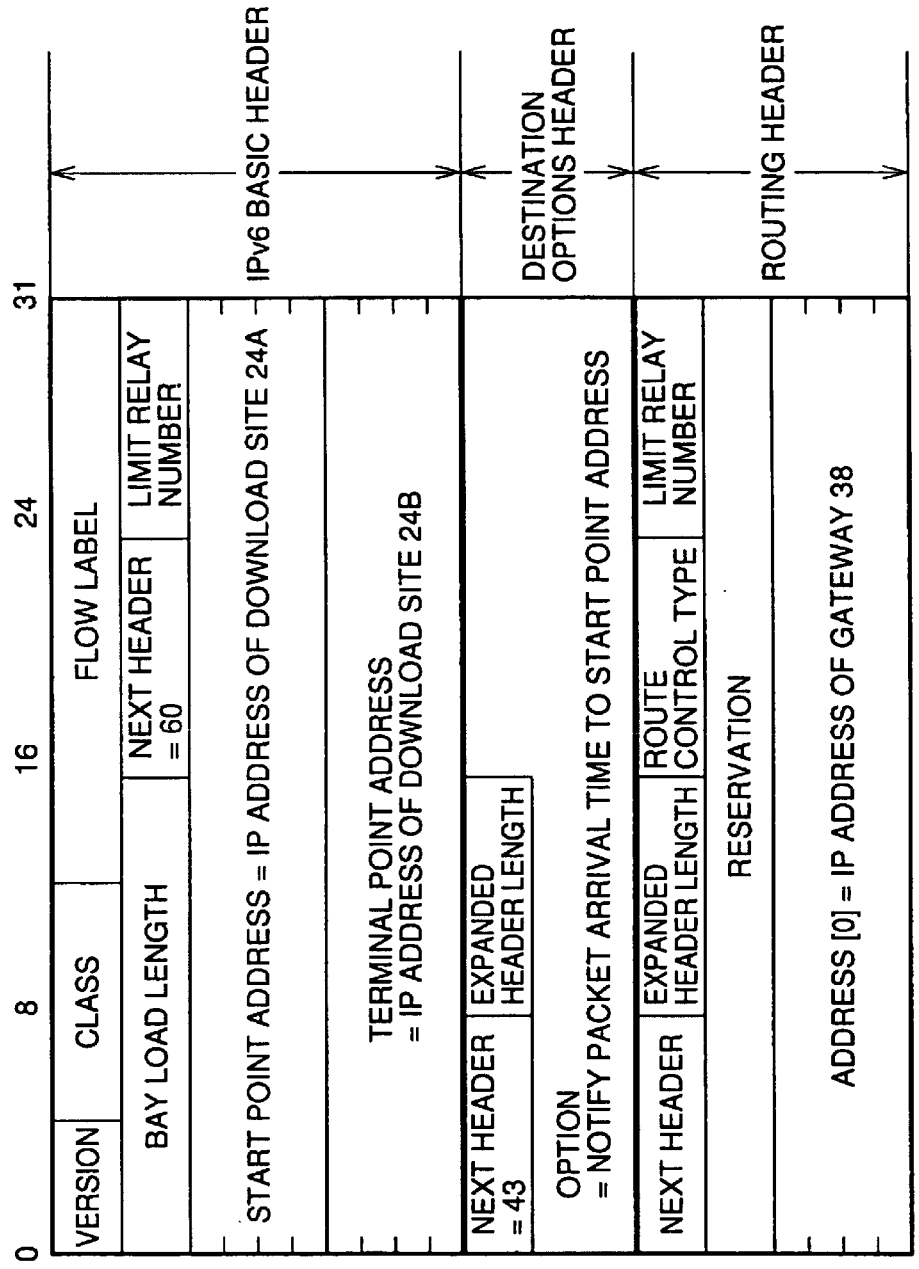
FIG. 14 shows IPv6 packet header format used for measuring the number of hops in the seventh embodiment of the present invention.

In order to transmit a packet from download site 24A via download site 24B to gateway 38, an IP address of download site 24B is described in the transmission destination address of IP header, and the IP address of gateway 38 is described in a Routing header of IP option header, as shown in FIG. 13, when IPv6 (IP version 6) is used.

Download site 24A may instruct download site 24B to calculate the number of hops and the time necessary for packet transmission/reception to gateway 38, by utilizing a terminal point option header of IP option header. More specifically, the contents of the Destination Options header is to describe the process required for the download site 24B as the host of the transmission destination address. By describing the contents of processing that the packet arrival time is calculated and notified to download site 24A, the above mentioned instruction can be realized.

Figure 15:
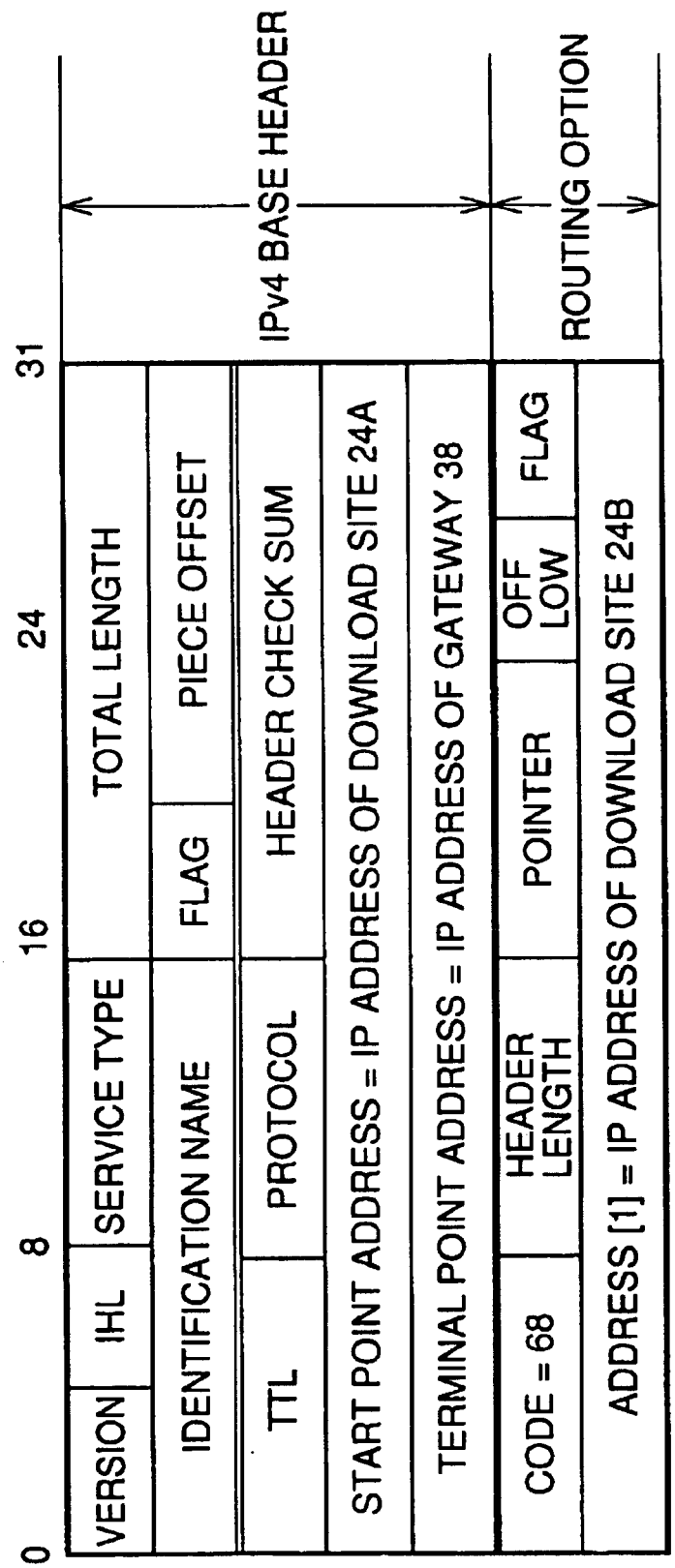
FIG. 15 shows IPv4 packet header format used for determining an optimal download site in the seventh embodiment of the present invention.
Figure 16:
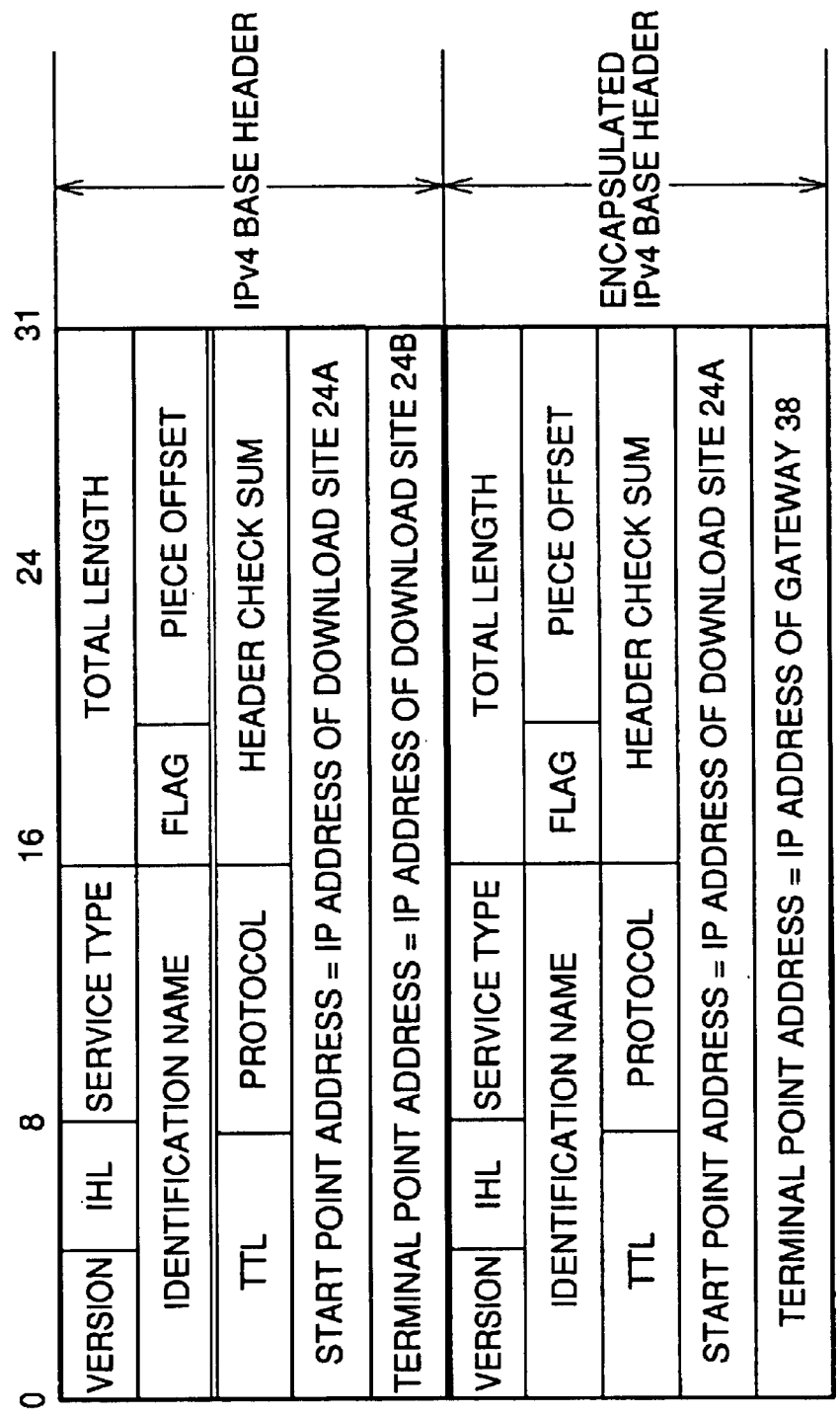
FIG. 16 shows IPv4 packet header format used for determining an optimal download site in the seventh embodiment of the present invention.

When IPv4 (IP versions 4) is used, the above described tasks can be realized by utilizing a transmission source route control or tunneling. The transmission source route control can be realized by using an option defined by Loose Source and Record Route option of IPv4, as shown in FIG. 15. Tunneling can also be realized in the similar manner, by encapsulating an original packet with an IP header having the host through which the IP packet is transmitted originally as a transmission destination, as shown in FIG. 16.

Download site 24A performs the above described process on all the appropriate download sites such as download site 24C, other than download site 24B, and compares the results to specify the optimal download site.

In a second example, the optimal download site is specified in the following manner. Download site 24A requests every download site to confirm the time or hop number necessary for packet transmission from the download site to the gateway 38. In response to the request, each download site measures the time or hop number necessary for packet transmission to gateway 38, and returns the result to download site 24A. Download site 24A compares the responses, and specifies an optimal download site.

More specifically, download site 24A broadcasts a request to confirm the time or hop number necessary for packet transmission to gateway 38, to every download site. Upon reception of the request, each download site measures the time or hop number necessary for packet transmission from itself to gateway 38, using Ping or Traceroute. Each download site transmits the result to download site 24A. Based on the responses, download site 24A specifies the optimal download site.

In the third example, the optimal download site is specified in the following manner. More specifically, in this example, by a network prefix of the IP address, the position of each download site on the network is confirmed. The Internet address is allocated in a hierarchical manner. In IPv4, the network "10.48.17.0" is formed as a network of a lower level of "10.48.0.0". Assume that the IP address of gateway 38 is "10.48.17.1" and IP addresses of download sites 24B and 24C are "10.48.16.1" and "10.47.0.1". In this case, from the view point of a network, it can be determined that download site 24B is preferable to download site 24C. More specifically, as shown in FIG. 17, for each download site, how many bits starting from the highest bit of network prefix coincide with the higher bits of gateway 38 is examined. A download site 24 that has the IP address with the longest sequence of coinciding bit numbers is selected.

Though three examples have been described, these methods may be combined.

After the optimal download site is specified, download site 24A notifies the information specifying the specified download site to gateway 38. Upon reception of the notification, gateway 38 requests the program to the download site determined in accordance with the notified information, receives the program transmitted from the download site, and stores the received program in the associated storage.

[Eighth Embodiment]

The eighth embodiment of the present invention is characterized in that, as compared with the method of distribution of the program in accordance with the seventh embodiment, an optimal download site is specified by gateway 38, not by the download site. The configuration of the network to implement the present embodiment is the same as that of the seventh embodiment. Therefore, detailed description thereof will not be repeated here.

In the present embodiment, program distribution is performed in the following manner. Each node obtains an IP address by DHCP (Dynamic Host Configuration Protocol) or the like when connected to the network, and uses the IP address as ID information identifying itself. The node that will be the server registers type number of the appliance as the node which the appliance itself has in advance, and position information (URL or IP address) of the download site and ID information (IP address) with gateway 38. A node as a client registers the attribute information (management information) such as the type number of the appliance as the node itself which the node has in advance, and ID information (IP address) with gateway 38.

Gateway 38 transmits position information (IP address) of itself to download site 24A through Internet 22, and request a list of the download sites. Upon request, download site 24 returns to the gate 38, a list of IP addresses of the download sites holding the same programs as itself. Gateway 38 specifies an optimal download site, by using the following method, among the received list.

Two examples of the method for specifying an optimal download site for gateway 38, where position information of download site 24A is described in the column of position information of the download site, among the information held by the server, will be described in the following.

In the first method, gateway 38 measures the time or hop number necessary for transmitting a packet from gateway 38 to each download site. By the results of measurements, a download site is specified. Here again, Ping or Traceroute is used.

In the second method, the position of each download site on the network is determined based on the network prefix of IP address. As already described, the IP address is allocated in a hierarchical manner Therefore, in this case also, as described in the seventh embodiment, the higher bits of the IP address of each download site are compared starting from the highest bit, with the IP address of gateway 38, and the download site of which IP address has the longest sequence of coinciding bits, is specified as the optimal download site.

Though two examples have been described separately, these two methods may be used combined with each other.

After the optimal download site is determined in this manner, gateway 38 requests the program to the optimal download site. In response to the request, the download site transmits the requested program, and therefore gateway 38 receives the program and stores the program in a storage provided in association with itself. Thereafter, gateway 38 transmits the thus obtained program to the server and the client immediately, or in response to a request from each node.

[Ninth Embodiment]

A system realizing a ninth embodiment of the present invention will be described in the following. The system configuration itself may be the one shown in FIG. 1 or FIG. 12. Therefore, detailed description thereof will not be repeated here.

In the ninth embodiment, the program is distributed to each node in the following manner. In the system implementing the present embodiment, it is assumed that the download site holds a plurality of different levels of client programs prepared in advance, in consideration with the type of OS (Operating System), capacity of the storage and so on, for the clients. Further, the download site holds a plurality of different levels of server programs in accordance with the scale of the network such as the number of clients per server, for the servers.

In the present embodiment, the program is distributed in the following manner. Each node obtains an IP address by DHCP (Dynamic Host Configuration Protocol) when connected to the network, for example, and uses the IP address as the ID information specifying itself. The node that will be the server registers the type number of the appliance as the node which the node itself has in advance, and position information (URL or IP address) of the download site and the ID information (IP address) with gateway 38. The node that will be the client registers the attribute information (management information) such as the type number of the appliance as the node itself, which the node has in advance, and ID information (IP address) with gateway 38.

Gateway 38 forms a management table 50 in accordance with a sequence, that will be described later. The contents of the management table of gateway 38 are as shown in FIG. 18. Referring to FIG. 18, for a node 32 as a server node, management table holds the IP address of node 32, type number designated by the manufacturer of the appliance as the node, position information (URL or IP address) of the download site, the name of the server program, and the version information of the program.

For the nodes 34 and 36 as the clients, type number designated by the manufacturer of the appliances as the nodes, position information (URL or IP address) of the download site, the name of the client program, the version of the program and the information of operational environment (OS, storage capacity and the like) are registered as management information, with gateway 38. Here, storage capacity refers to the capacity of free memory for holding the program. Dependent on the size of this capacity, what size of the program can be held is determined. OS information specifies which program can be operated in the environment.

In the ninth embodiment, the program is distributed in the following manner. Referring to FIG. 19, a node as a client (for example, node 34) obtains an IP address by DHCP, for example, at the time of network connection, and after IP connection is established S901, uses this address as ID information specifying itself. Further, node 34 retransmits the IP address of itself, type number of the appliance and the URL to gateway 38, and gateway 38 registers the information as management information, in management table. Similarly, the node as the server (node 32) obtains the IP address by IP connection (S903), and registers the type number of the appliance it holds in advance, position information (URL or IP address) of the download site and ID information together, with gateway 38 (S904).

Gateway 38 specifies the optimal download site, by using the method described with reference to the seventh and eighth embodiments.

Before downloading the program, gateway 38 transmits the IP address of itself to download site (for example, download site 24A), and asks the optimal download site (S905). In response to the inquiry, download site 24A determines the optimal download site for gateway 38 in accordance with the method described with reference to the seventh or eighth embodiment, and notifies to gateway 38 (S906). Here, it is assumed that download site 24B is notified as the optimal download site.

Gateway 38 notifies information such as the IP address of gateway 38, type number of the appliance of server node 32 and the like to download site 24B, and requests transmission of the program information (S907). In response to the request, download site 24B obtains the server program name, the client program name, version information of respective programs and the operational environment (S908). When there are a plurality of different client programs, existence of such programs can be known at this time point. Therefore, in that case, information related to the difference in function, necessary OS and the storage capacity required for execution for each client program is notified as operational environment, to gateway 38.

Gateway 38 compares the received program information with the information related to the client described in the management table, and specifies and selects the optimal program for each client (S909).

Thereafter, gateway 38 requests transmission of the program by designating the program name, to the download site (download site 24B) notified in step S906 (S910). In response to the request, the program is transmitted from download site 24B to gateway 38 (S911). Gateway 38 receives the program, and stores the program in the storage provided'in association with the gateway 38. Gateway 38 transmits the thus obtained program to each node immediately, or in response to a request from each node (S912, S913).

[Tenth Embodiment]

The configuration of the network system implementing the tenth embodiment of the present invention is the same as that shown in FIG. 1 or FIG. 12. Therefore, detailed description thereof will not be repeated here. The tenth embodiment differs from the ninth embodiment in the sequence of application distribution to the client.

In the system of the present embodiment also, the contents of the management table maintained in gateway 38 are the same as that shown in FIG. 18, and description thereof is not repeated here.

The sequence for program distribution in the present embodiment is as follows.

Figure 20:
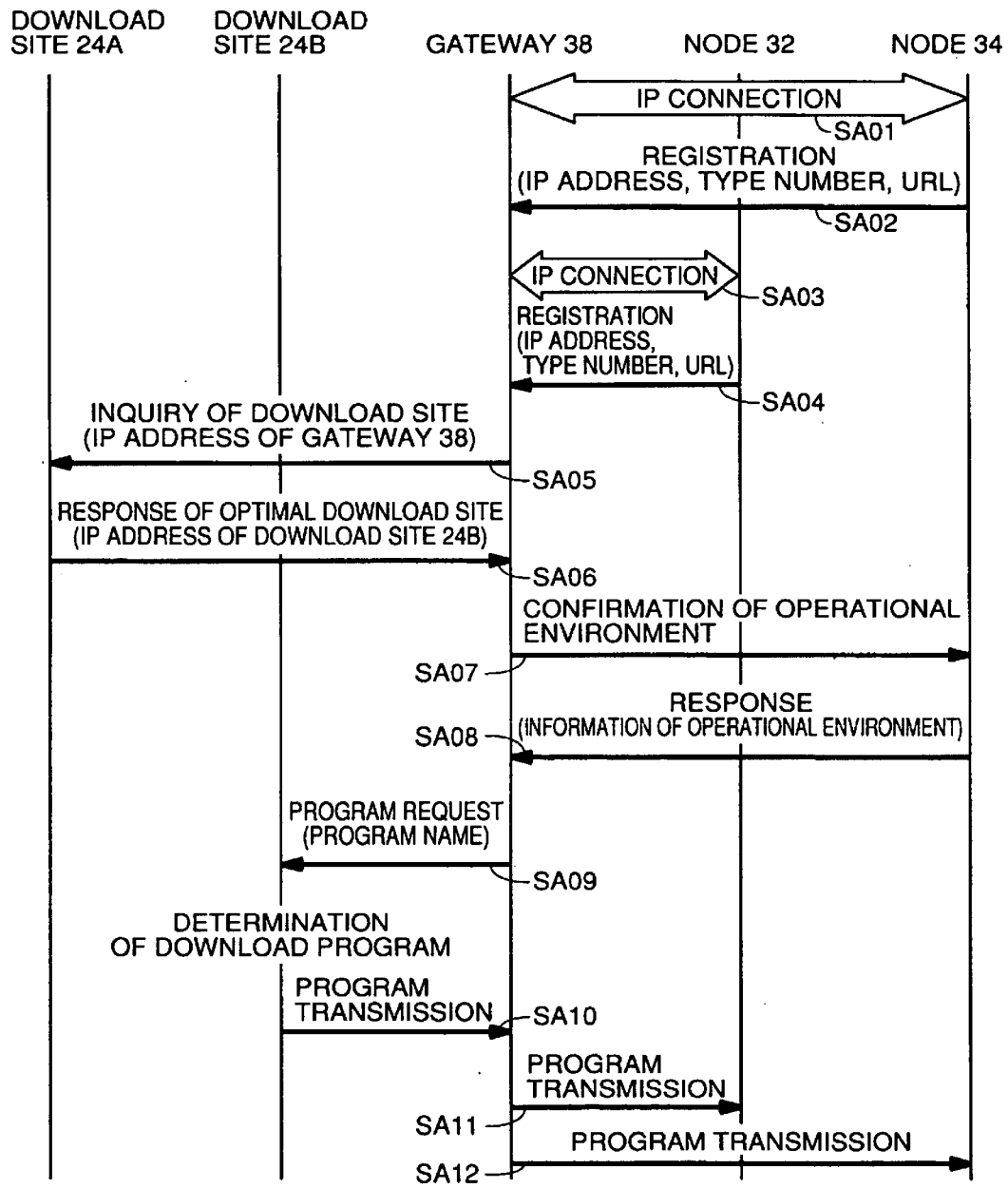
FIG. 20 shows a sequence for distributing a program to each node in the tenth embodiment of the present invention.

Referring to FIG. 20, a client node (for example, client node 34) obtains an IP address by DHCP, for example, by network connection, and after IP connection is established (SA01), uses the IP address as the ID information specifying itself. Client node 34 registers information related to operational environment, including type number of the appliance as: the node it holds in advance, the OS as the operational environment of the program at the node and the memory capacity, in the management table of gateway 38 (FIG. 18) (SA02).

The node as a server (for example, node 32) obtains an IP address by DHCP, for example, by network connection, and after the IP connection is established (SA03), uses the IP address as the ID information specifying itself. Server node 32 registers the type number of the appliance as node 32 it has in advance, position information (URL or IP address) of the download site and the ID information (IP address) of itself together in the management table of gateway 38 (SA04).

Gateway 38 inquires the optimal download site to download site, 24A (SA05), and holds the IP address of the optimal download site transmitted from download site 24A (SA06). In this example, it is assumed that download site 24B is selected as the optimal download site.

Here, in order to determine the optimal download site, the method described in the seventh or eighth embodiment may be used.

After the server node (node 32) is connected to the network, gateway 38 distributes the client program to the client nodes in the following manner. Gateway 38 inquires the operational environment to all the nodes that will be the possible clients, in the management table (SA07). Here, gateway 38 confirms information that may possibly be changed, such as the memory capacity, among the information of the management table held therein in advance.

A node that will be a client notifies information representing the present status of the node to gateway 38, in response to the inquiry (SA08). In accordance with the information, gateway 38 updates the contents of the management table.

Further, gateway 38 transmits based on the contents of the management table, the number of nodes that will be the client for the server and information related to operational environment of each node (OS, memory capacity and the like) to download site 24B so that the download site 24 can select the programs to be held by the server node and respective client nodes to receive the service from the server of node 32, and requests transmission of the selected program (SA09). Download site 24B selects the server program in accordance with the network scale and the client program suitable for the operational environment at each client node, based on the transmitted operational environment, and transmits the selected programs to gateway 38 (SA10). Gateway 38 stores the transmitted programs in the storage provided in association with gateway 38.

Gateway 38 transmits the server program among the thus obtained programs, to server node (for example, node 32), and the client program to the client node (for example, node 34), respectively (SA11, SA12). This transmission may be performed immediately after the reception of the programs from the download site, or after reception of a transmission request of the program from each node.

In the present embodiment, information other than those described above, such as the information related to the user interface, for example, whether GUI (Graphical User Interface) is used or not, or whether the client requires only a simple operation or not, as well as information related to the usage of the program at each node may be used as the conditions for selection. Whether GUI is used or not or whether a simple operation only is to be implemented may have significant influence on the size of the program. Therefore, the programs are classified by levels dependent on the program usage such as the user interface to be realized at the client node, and programs for respective levels are prepared in advance and held at the download site. For each client, a program corresponding to the required level at the client is distributed. Thus, an operational environment not consuming the resources unnecessarily at each node can be realized.

Further, a plurality of different types of server programs of different levels are prepared at the download site, in accordance with the expected number of nodes that will be the clients. The download site selects the server program of the level corresponding to the number of clients transmitted from the gateway, and transmits the selected server program.

As described above, by the present invention, it becomes unnecessary for an appliance constituting each node to hold in advance a wasteful program that will not be used for communication. Therefore, limited resources of respective appliances can be used effectively.

In the conventional network, "plug-and-play" has been limited to provision of a pure network function such as automatic acquisition of an IP address or automatic acquisition of information required for transmission/reception of the IP packet. When a home network is considered, it is expected that applications specified for various and many appliances, or appliances providing various services are connected to the network. Here, both the program on the side of service provider and the program on the side receiving the service are necessary to establish communication between the appliances. Conventionally, complicated manual work has been necessary to realize such communication. By the present invention, it becomes possible to realize "plug-and-play" to such an extent that the server can receive communication from a client node when simply connected to the network, without any concern as to the existence of the client connected to the home network.

Further, the program can be downloaded to each appliance when the appliance is connected to the network at home or when communication is to be made, from a download site or a gateway, not at the time of shipment. Therefore, it is possible at each node to use the latest program.

Even when the program is updated after the program is downloaded to the appliance, it is easy to follow up the updating. Thus it is possible at each node to use the latest program constantly, and failure of communication resulting from unmatching versions of the programs between the nodes can be avoided.

Even when a defect of the program is found, a program with the defect fixed can readily be downloaded to each node.

In a communication in a client server model, in response to a connection of a node serving as the server to the network, an optimal program can be downloaded to the server node or the client node. It is possible to select, among a plurality of program distribution sites on a data communication network, the optimal site in view of the network path, and transmit the program to the gateway. Therefore, the traffic on the network can be reduced, and high speed and stable communication becomes possible.

Further, among a plurality of programs for the server and the client, an optimal program is selected in consideration of the operational environment. Therefore, an operational environment without excessive or wasteful load can be realized, effectively utilizing the resources of each node. For the server, a program corresponding to the number of clients is distributed, taking into consideration the network scale, and therefore wasteful use of the resources of the server having small number of clients can be avoided. Further, a client program determined in consideration with the OS and the memory capacity as the operational environment of that node is distributed, and therefore secure operation is realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for distributing a programs to be operated on a server node and/or at least one client node connected to a network using a network gateway, wherein said network is connected to a data communication network through said network gateway, wherein at least one program distribution site is connected to said data communication network, and wherein said at least one program distribution site (i) holds a server program and/or a client program necessary for communication with a server using said server program, and (ii) has a function of distributing, upon request, said server program and/or client program to said network gateway;

said method of distributing a programs using said network gateway comprising the steps of in said network gateway;

preparing a management table storing management information for each said server nodes connected to said network;

receiving, from a new server starting a provision of a service on said network from said server node connected to said network, management information related to said new server including a specification of at least one of said at least one program distribution site that holds a server program associated with said new server and/or a client program associated with said new server;

updating said management table in response to the reception of said management information from said new server;

requesting in response to the reception of said management information from said new server, a transmission from said at least one of said at least one program distribution site of said server program associated with said new server and said client program associated with said new server;

receiving at said network gateway, and storing in a storage provided in association with said network gateway, said server program and said client program transmitted from said at least one of said at least one program distribution site in response to said request;

transmitting said server program associated with said new server stored in said storage to said new server; and identifying, by making a reference to said management table, and transmitting said client program associated with said new server stored in said storage to client nodes that request that request communication with said new server.

2. The method for distributing a programs using a network gateway according to claim 1, wherein said step of transmitting said server program to said new server comprises the step of:

transmitting said server program to said new server in response to the reception of said server program by said network gateway from said at least one of said at least one program distribution site.

3. The method for distributing a program using a network gateway according to claim 1, wherein said step of transmitting said server program to said new server comprises the step of:

transmitting said server program to said new server in response to the reception by said network gateway of a request for said server program from said new server.

4. The method for distributing programs using a network gateway according to claim 1, wherein said at least one of said at least one program distribution site includes a plurality of said program distribution sites connected to said data communication network, and at least one of said plurality of said program distribution sites includes the function of specifying its position on said data communication network relative to said network gateway and notifying said network gateway of the same;

said step of requesting transmission of said server program associated with said new server and said client program associated with said new server comprises the steps of:

determining, in response to the reception of said management information from said new server, an at least one of said plurality of program distribution sites specified by said management information the position of which on said data communication network relative to said network gateway satisfies a predetermined condition; and requesting the at least one program distribution site determined to satisfy said predetermined condition to transmit said server program associated with said new server and/or said client program associated with said new server to said network gateway.

5. The method for distributing a programs using a network gateway according to claim 1, wherein said at least one of said at least one program distribution site includes a plurality of said program distribution sites connected to said data communication network; and said step of requesting a transmission of said server program associated with said new server and said client program associated with said new server comprises the steps of:

obtaining position information on said data communication network for said at least one of said at least one program distribution sites specified by said management information in response to the reception of said management information from said new server, selecting at least one of said at least one program distribution site the position information of which on said data communication network satisfies a predetermined condition, and requesting said at least one selected program distribution site to transmit said server program associated with said new server and/or said client program associated with said new server.

6. The method for distributing a programs using a network gateway according to claim 1, wherein said at least one of said at least one program distribution site holds a plurality of programs for an application; and said method further comprises the steps of:

obtaining program information relative to said plurality of programs from said at least one of said at least one program distribution site in response to the reception of said management information from said new server, specifying a server and client programs to be transmitted, based on the program information relative to said plurality of programs received from said at least one of said at least one program distribution site, and requesting said specified program distribution site, to transmit the program specified as said server program associated with said new server, and/or the program specified as said client program associated with said new server.

7. The method for distributing a programs using in a network gateway according to claim 1, wherein said at least one specified program distribution site holds a plurality of programs for an application;

said step of requesting a transmission of said server program associated with said new server and said client program associated with said new server comprises the steps of:

obtaining from a node that is to be said client management information relating to said node that is to be said client in response to the reception of said management information from said new server, transmitting said management information of the node that is to be said new server, and said management information of the node that is to be said client to said at least one specified program distribution site, wherein said at least one specified program distribution site has a function of determining and transmitting to said network gateway a program to be transmitted to each node of said network based on the management information of the node that is to be said new server and/or the management information of the node that is to be said client; and said step of receiving and storing said programs comprises the step of:
receiving and storing in said storage provided in association with said network gateway said server program associated with said new server and said client program associated with said new server determined and transmitted by said at least one specified program distribution site based on the management information of the node that is to be said new server and the management information of the node that is to be said client.

8. A method for distributing a programs to be operated on a server node and/or at least one client node connected to a network using a network gateway, wherein said network is connected to a data communication network through said network gateway, wherein at least one program distribution site is connected to said data communication network, and wherein said at least one program distribution site (i) holds a server program and/or a client program necessary for communication with a server using said server program, and (ii) has a function of distributing, upon request, said server and/or client program to a node connected to said network in response to a request therefor by said node;

said method for distributing programs using said network gateway comprising the steps of:
preparing in said network gateway a management table storing management information for each of said server nodes connected to said network;
receiving at said network gateway from a new server starting a provision of a service on said network from said server node connected to said network, management information related to said new server;
updating said management table in response to the reception of said management information from said new server by said network gateway
requesting a transmission of information related to a server program associated with said new server and information related to a client program associated with said new server from said at least one of said at least one program distribution site;
receiving at said network gateway from said at least one of said at least one program distribution site and storing in a storage provided in association with said network gateway said information related to said server program associated with said new server and said information related to said client program associated with said new server;
transmitting said information related to said server program associated with said new server stored in said storage provided in association with said network gateway to said new server;
in response to a request by a client node connected to said network, to said client node said information associated with said client program stored in said storage;
comparing at said new server said information related to said server program associated with said new server received from said storage provided in association with said network gateway with information related to a server program running on said new server;

comparing at said client node said information related to said client program associated with said new server with information related to a client program running on said client node;
determining, based upon said comparisons, whether said program running on said new server node and/or said program running at said client node requires updating and/or replacement; and
if said programs running on said new server node and/or on said at least one client node of said network require updating and/or replacement, requesting said at least one of said at least one program distribution site to transmit said server program to said new server node and/or said at least one of said at least one program distribution site to transmit said client program to said client node, directly.

9. The method for distributing programs using a network gateway according to claim 8, wherein
said step of transmitting said information related to said server program to said new server comprises the step of:
transmitting said information related to said server program to said new server in response to to a request from said new server therefor.

10. A method for distributing a programs using a network gateway connecting a network to a data communication networks, wherein at least one program distribution site connected to said data communication network is provided, said at least one program distribution site holding a server program and/or a client program necessary for communication with a server using said server program and having a function of distributing a program to at least one node connected to said network in response to a request by said node therefor;

said method for distributing a programs using a network gateway comprising the steps of:
preparing a management table storing management information for said server nodes connected to said network;
receiving a program at said network gateway from a at least one of said at least one program distribution site, storing said received program in a storage provided in association with said network gateway, and transmitting said received program to at least one node connected to said network;
detecting an updated version of said received program stored in said storage held in said at least one of said at least one program distribution site, and updating said received program stored in said storage using said updated version of said program held in said at least one of said at least one program distribution site;
requesting transmission of said updated version of said received program to said node holding said received program;
transmitting said updated version of said received program stored in said storage to said node holding said received program in response to a request therefor by said node holding said received program, and
updating said received program at said node holding said received program using said transmitted updated version of said received program.

11. The method for distributing programs using a network gateway according to claim 10, further comprising the step of updating said received program stored in said storage using said updated version of said program, wherein said step of updating said received program comprises:
detecting an updated version of said received program by making inquiry as to whether there has been an update of said received program at said at least one of said at least one program distribution site periodically, transmitting in response to a detection of an updated version of said received program a request for said updated version of said received program to said at least one of said at least one program distribution site, and modifying or replacing said received program using said updated version of said received program transmitted from said at least one of said at least one program distribution site in response to said request for said detected updated version of said received program.

12. The method for distributing a programs using a network gateway according to claim 10, further comprising the step of updating said received program stored in said storage using said new version of said received program, wherein said step of updating comprises transmitting a request for an updated version of said received program to said at least one of said at least one program distribution site in response to the reception of a notification received from said at least one of said at least one program distribution site that said received program has been updated, and modifying or replacing said received program stored in said storage using said updated version of said received program from said at least one of said at least one program distribution site.

13. A method for distributing programs to be operated on a server node and/or at least one client node connected to a network using a network gateway, wherein said network is connected to a data communication network through said network gateway, wherein a at least one program distribution site is connected to said data communication network, and wherein said at least one program distribution site (i) holds a server program and/or a client program necessary for communication with a server using said server program, and (ii) has a function of distributing, upon request, said server and/or client program to a node connected to said network in response to a request by said network gateway therefor, said method of distributing a program using a network gateway comprising the steps of:

preparing in said network gateway a management table storing management information for said server nodes connected to said network;

receiving at said network gateway information relating to a program held by a node connected to said network from at least one of said at least one program distribution site, and storing said received information relating to said program in a storage provided in association with said network gateway;

detecting at said network gateway an updated version of said program held by said node connected to said network stored in said at least one of said at least one program distribution site, and updating said information relating to said program held by said node connected to said network stored in said storage with information relating to said updated version of said program held by said node connected to said network stored in said at least one of said at least one program distribution site;

transmitting said information relating to said updated version of said program held by said node connected to said network to said node connected to said network holding said program updating of said program in said storage in response to a request by said network gateway; and determining at said node connected to said network holding said program whether an updated version of said program should be requested by said node based upon said information relating to said updated version of said program held by said node provided to said node by said network gateway.

14. The method for distributing a programs using a network gateway according to claim 13, wherein said step of updating said program information comprises the steps of:

detecting whether a said program held by said node has been updated by making periodic inquiry to said at least one of said at least one program, distribution site, if a response to an inquiry indicates that said program held by said node has been updated, transmitting a request for program information relating to said updated version of said program held by said node to said at least one of said at least one program distribution site, and modifying or replacing said program information relating to said program held by said node stored in said storage using said updated version of said program information relating to said program held by said node held in said at least one of said at least one program distribution site.

15. The method for distributing a programs using a network gateway according to claim 13, wherein said step of updating said program information relating to said program held by said node comprises the steps of:

transmitting a transmission request for information relating to an updated version of said program held by said node to said at least one of said at least one program distribution site in response to the reception of a notification of an update of said program held by said node received from said at least one of said at least one program distribution site, and modifying or replacing said program information relating to said program held by said node stored in said storage using said updated version of said program information relating to said program held in said node held in said at least one of said at least one program distribution site.

* * * * *